US011565265B2

(12) United States Patent
Brossard

(10) Patent No.: US 11,565,265 B2
(45) Date of Patent: Jan. 31, 2023

(54) DEVICE FOR PACKAGING BALLS FOR REACTION VESSELS FOR AN ANALYSIS APPLIANCE

(71) Applicant: DIAGNOSTICA STAGO, Asnieres sur Seine (FR)

(72) Inventor: Matthieu Brossard, Rueil-Malmaison (FR)

(73) Assignee: DIAGNOSTICA STAGO, Asnieres sur Seine (FR)

( * ) Notice: Subject to any disclaimer, the term of this patent is extended or adjusted under 35 U.S.C. 154(b) by 252 days.

(21) Appl. No.: 16/606,248

(22) PCT Filed: Apr. 10, 2018

(86) PCT No.: PCT/FR2018/050898
§ 371 (c)(1),
(2) Date: Oct. 18, 2019

(87) PCT Pub. No.: WO2018/193184
PCT Pub. Date: Oct. 25, 2018

(65) Prior Publication Data
US 2020/0038873 A1 Feb. 6, 2020

(30) Foreign Application Priority Data

Apr. 20, 2017 (FR) ..................................... 1753414

(51) Int. Cl.
*B01L 3/00* (2006.01)
*B65D 83/04* (2006.01)
*G01N 35/00* (2006.01)

(52) U.S. Cl.
CPC .............. *B01L 3/523* (2013.01); *B65D 83/04* (2013.01); *B01L 2300/046* (2013.01);
(Continued)

(58) Field of Classification Search
CPC .............. B01L 3/523; B01L 2300/046; B01L 2300/0832; B01L 2300/123;
(Continued)

(56) References Cited

U.S. PATENT DOCUMENTS 4,101,284 A 7/1978 Difiglio et al.
4,150,766 A * 4/1979 Westendorf ........ B65D 83/0409
221/112

(Continued)

FOREIGN PATENT DOCUMENTS

EP 0 325 874 A1 8/1989
WO WO-0009419 A2 * 2/2000 ................ A61J 7/04
WO 03/065047 A1 8/2003

OTHER PUBLICATIONS

International Search Report and Written Opinion, dated Jul. 3, 2018, from corresponding/related International Application No. PCT/FR2018/050898.

*Primary Examiner* — Benjamin R Whatley
*Assistant Examiner* — Jacqueline Brazin
(74) *Attorney, Agent, or Firm* — Nixon & Vanderhye

(57) ABSTRACT

Disclosed is a device for packaging balls for reaction vessels for an analysis appliance, including: a body including at least one opening and used to house balls, a closing member, that can be moved relative to the body between a closed position in which the closing member closes the opening of the body, and an open position in which the opening of the body is open so as to allow the balls to be dispensed from the body.

15 Claims, 19 Drawing Sheets

(52) U.S. Cl.
CPC . *B01L 2300/0832* (2013.01); *B01L 2300/123* (2013.01); *G01N 35/00* (2013.01); *G01N 2035/00574* (2013.01)

(58) Field of Classification Search
CPC ....... B01L 2200/026; B01L 2200/0647; B01L 2300/049; B01L 2400/043; B65D 83/04; G01N 35/00; G01N 2035/00574
USPC .......................................................... 422/547
See application file for complete search history.

(56) References Cited

U.S. PATENT DOCUMENTS

| | | | |
|---|---|---|---|
| 4,405,060 A * | 9/1983 | Hsei .................. | B65D 83/0409 221/135 |
| 4,456,581 A * | 6/1984 | Edelmann .......... | B01F 15/0233 422/72 |
| 4,918,984 A | 4/1990 | Martinoli et al. | |
| 5,014,877 A | 5/1991 | Roos | |
| 5,336,469 A | 8/1994 | Tobiki et al. | |
| 7,507,377 B2 | 3/2009 | Rousseau et al. | |
| 2005/0175502 A1 | 8/2005 | Rousseau et al. | |
| 2006/0012130 A1* | 1/2006 | Vann ..................... | G01N 35/10 277/595 |
| 2006/0275178 A1 | 12/2006 | Chang et al. | |
| 2008/0011773 A1 | 1/2008 | Tobias | |
| 2014/0171344 A1* | 6/2014 | Bunce ................. | B01L 3/5085 506/39 |
| 2014/0242685 A1* | 8/2014 | Knoppke ........... | B01L 3/50825 435/289.1 |

* cited by examiner

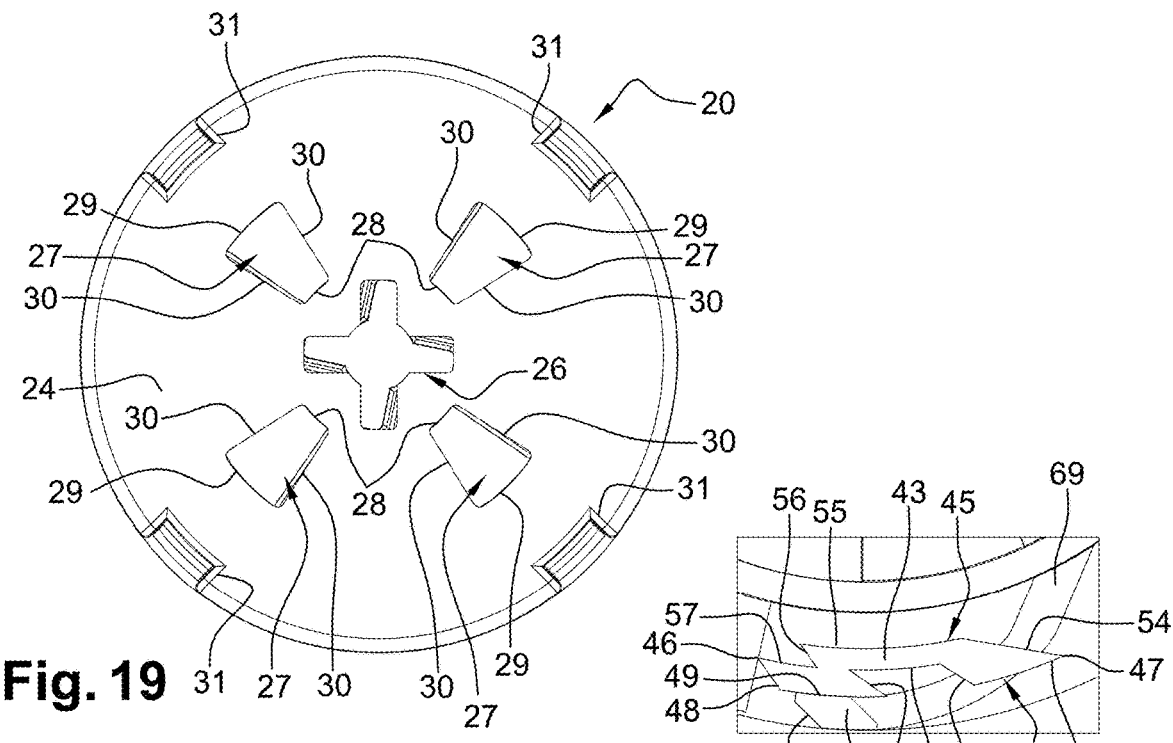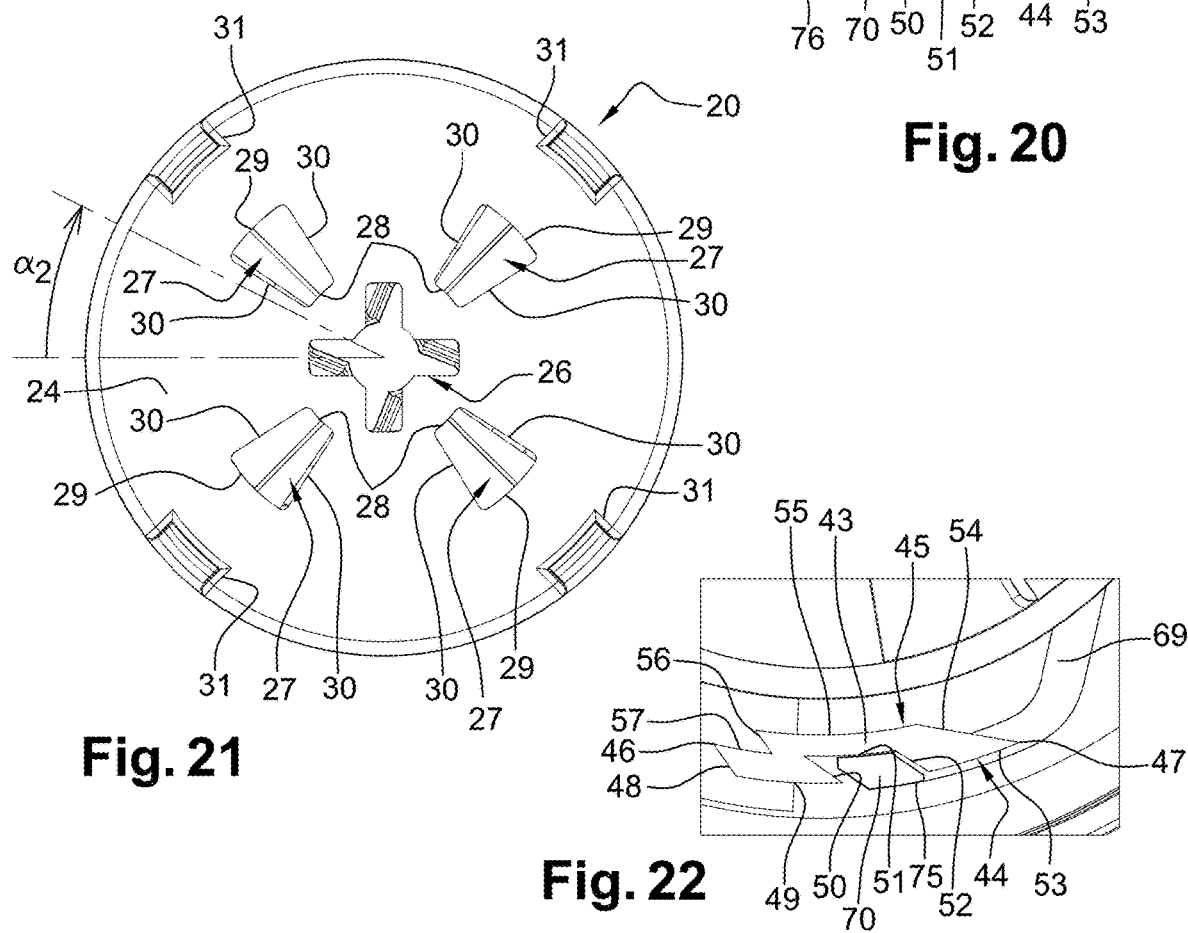

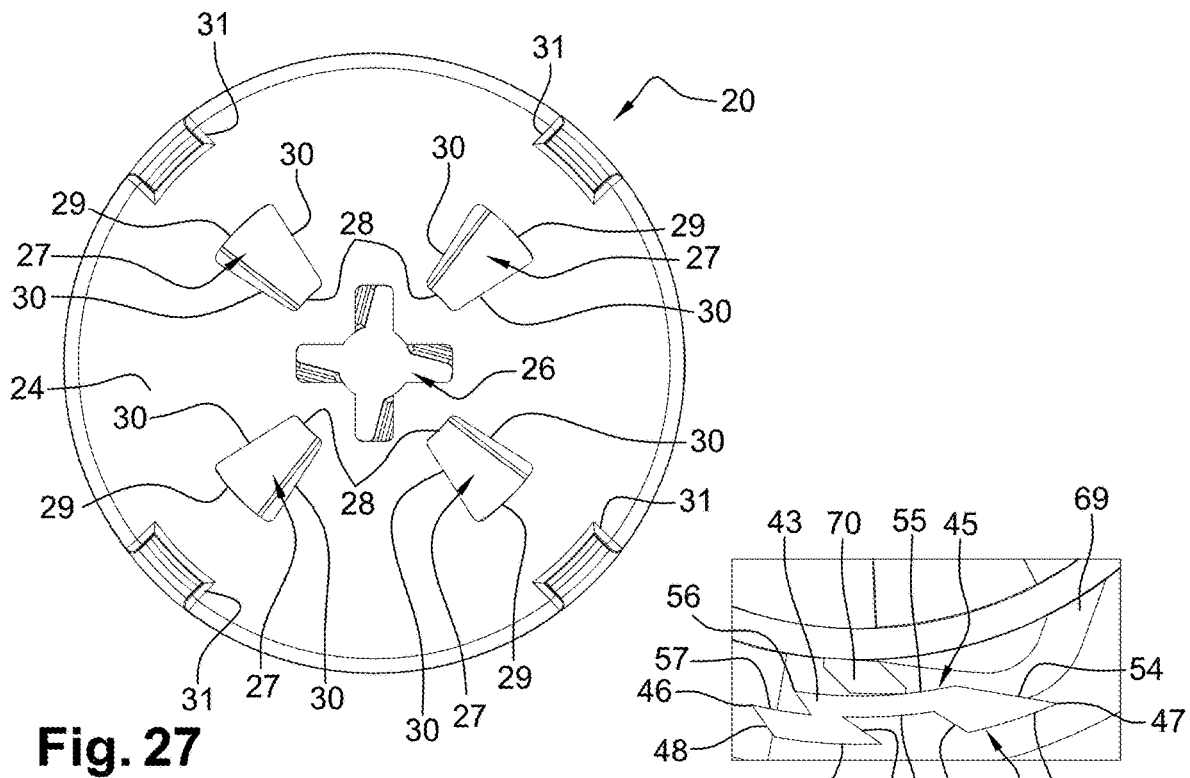
Fig. 27
Fig. 28
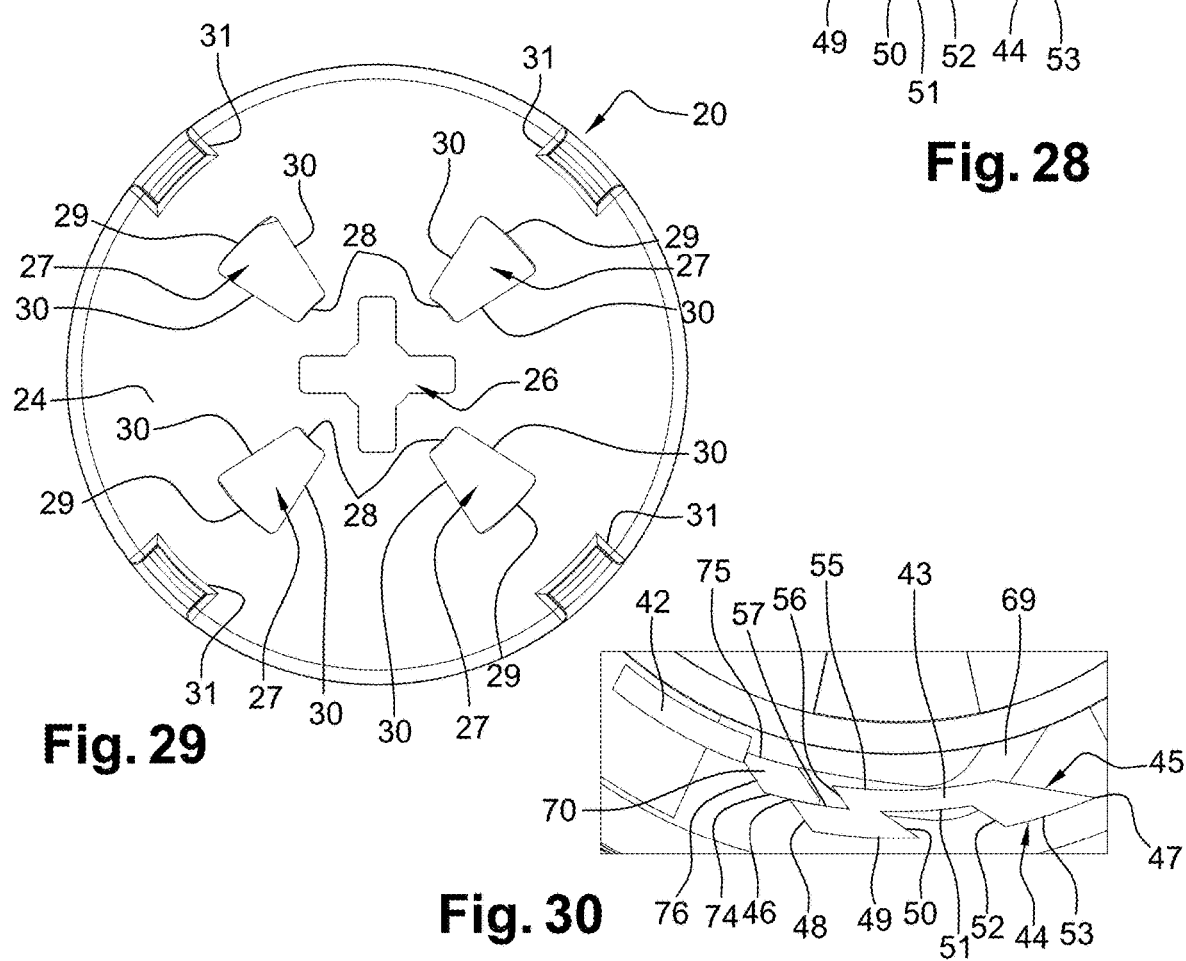
Fig. 29
Fig. 30

DEVICE FOR PACKAGING BALLS FOR REACTION VESSELS FOR AN ANALYSIS APPLIANCE

This invention relates to a device for packaging balls for reaction vessels for an analysis appliance, such as an automatic appliance for the analysis of chemical or biological samples.

Such devices are used, for example, to determine the times of modification of the physical state of a medium, in particular to determine the coagulation time of a blood sample.

BACKGROUND OF THE INVENTION

Reaction vessels are already known from documents EP 0 325 874 and WO 03/065047 and are used to determine the times of modification of the physical state of a medium, in particular to determine the coagulation time of a blood sample. These vessels are open at their upper ends and have curved bottoms forming raceways of a ball of ferromagnetic material that is that can be moved in the vessel in periodic movement using an external magnetic field. Variations in the amplitude and/or frequency of ball movements are representative of the physical condition of the blood sample.

In WO-A-03/065047, the vessels containing the balls are detachably attached side by side to a flexible carrier film that seals their upper ends and can be wound on a reel to feed an automatic analysis appliance and scroll the vessels in succession through the appliance.

SUMMARY OF THE INVENTION

If it is desired to insert a ball into each vessel before analysis, such an introduction can be carried out automatically within the analysis appliance. This allows in particular that some vessels are used for new tests for which the use of balls is not necessary. For each vessel, depending on the test to be performed, it will therefore be possible to insert or not a ball into said vessel.

The invention more particularly aims at providing a simple, efficient and cost-effective solution to this problem.

To this end, it offers a device for packaging balls for reaction vessels for an analysis appliance, comprising:
 a body comprising at least one opening, said body being used to house balls,
 a closing member, that can be moved relative to the body between a closed position in which the closing member closes the body opening, and an open position in which the body opening is open so as to allow balls to be dispensed from the body.

The ball packaging device is used to house balls and allow the dispensing thereof from the body by a relative movement of the closing member relative to the body. For this purpose, it is possible, for example, to keep the body stationary and move the closing, or conversely to keep the closing member stationary and move the body.

The body may comprise a first part and a second part mounted on the first part or in the first part, said first and second parts defining a housing for the balls, the closing member being mounted in said housing.

The second part can be attached to the first part by latching means, said latching means being designed to allow the latching assembly of said parts and prevent the withdrawal of the second part from the first part after latching of said parts.

The disassembly of the second and first parts is thus prevented by the latching means. It is then not possible to recharge the ball device, for example. The device is therefore for single use only.

The closing member can be mounted so that it can be pivoted relative to the body.

The pivot axis is preferably the body axis and/or the axis of the closing device.

The body may have an indentation for the passage of a coupling member, the closing member having an indentation capable of cooperating with the coupling member, the indentation of the closing member being located opposite the indentation of the body in the closed position and being angularly spaced from the indentation of the body in the open position.

Thus, in use, when the packaging device is closed in such a way as to retain the balls, the coupling member can be inserted through the body indentation until it fits into the indentation of the closing member. The relative rotation of the coupling member relative to the body causes the rotation of the closing member, by shape cooperation between the coupling member and the indentation of the closing member.

The closing member can thus be moved to its open position allowing balls to pass through the body opening. It should be noted that, in the open position, the device is held on the coupling member. Indeed, since the body indentation is no longer aligned or facing the indentation of the closing member, the body indentation no longer allows the removal of the coupling element. This secures the transfer of the balls from the device to the analysis appliance.

The closing member and the body may include guide means to allow the rotation of the closing member relative to the body, only from an initial closed position to an open position and then only from the open position to a final closed position.

The guide means make it possible to direct the rotation of the closing, as a ratchet wheel for example, by preventing any rotation opposite the authorised rotation. This guidance is done in two successive phases. In a first phase, only the movement of the closing to its open position is allowed. In a second phase, which starts when the closing is fully open, only the movement of the closing to its closed position is allowed. At the end of the second phase, the device is completely closed and can no longer be reopened. It is therefore no longer usable.

In the first and/or second phase, the guide means may be designed to avoid partially opening or closing the device and then closing or opening it, respectively.

The guide means may include a first latching zone and a second latching zone opposite each other, said latching zones being, for example, notched or toothed, said guide means further comprising an elastic tab cooperating with the first latching zone when the closing member rotates relative to the body, from its initial closed position to its open position, the elastic tab cooperating with the second latching zone when the closing member rotates relative to the body, from its open position to its final closed position, the latching zones belonging to the closing member, the elastic tab belonging to the body, or vice versa.

Each latching zone can be extended circumferentially in an arc.

Each latching zone can be toothed and can extend generally in a radial plane, each tooth having a surface inclined relative to the corresponding radial plane and a stop surface extending generally perpendicular to the radial plane.

The toothed zones allow rotation in one direction only of the closing member relative to the body. In addition, the toothed zones can also be used as indexing means, so as to create intermediate opening or closing positions, in particular to regulate the flow rate of ball dispensing from the body.

The latching zones may have inclined surfaces allowing the tab to slide along said inclined surfaces by elastic deformation of the tab when the closing member rotates relative to the body in the authorised direction.

The latching zones may also have stop surfaces, the tab being able to rest against said stop surfaces, so as to prevent the rotation of the closing member relative to the body in the direction opposite the authorised direction.

The guide means may include stop means capable of limiting the rotation of the closing member between its open and closed positions.

For example, the stop means are formed by the elastic tab and surfaces extending perpendicular to the radial plane, i.e. along the axis of rotation. Thus, in the closed or open position, the tab is able to rest on the corresponding stop surface.

The closing member may include at least one helix portion inclined towards at least one opening of the closing member.

The helix portion then facilitates the dispensing of the balls by directing them by gravity towards the opening. The opening of the closing device and the opening of the body are aligned or facing each other, in the open position, and spaced from each other, in the closed position.

The first part of the body may have a cylindrical wall extending from a back wall.

The first part of the body can form a cover.

The opening and/or the indentation can be made in the bottom of the first part. Ports can be provided in the cylindrical wall of the first part. These ports may belong to the latching means of the first part relative to the second part of the body, said ports being used, for example, to engage latching projections of the second part of the body.

The second part of the body may have a generally cylindrical wall extending from a back wall. The bottom wall of the second part of the body can be opposite the bottom wall of the first part of the body.

The second part of the body can be mounted, at least in part, in the cylindrical wall of the first part of the body.

The indentation can be cross-shaped.

The second part of the body can be made of a transparent material such as glass or plastic for example.

The cylindrical wall may have flat zones or a polygonal, for example pentagonal shape, to facilitate gripping.

The first part of the body may have at least two openings, for example four openings evenly distributed over the circumference.

The closing member may include a central cone that guides the balls to the helix portion.

The balls have a diameter between 1 and 2 mm, for example.

The invention also relates to an assembly comprising a packaging device of the aforementioned type, and a collecting device, the collecting device comprising:
  a support, said support comprising at least one opening and collecting means, said opening being intended to be located opposite the opening of the body of the packaging device,
  a closing member that can be moved relative to the support between a closed position in which the closing member closes the opening of the support, and an open position in which the opening of the support is open,
  a coupling member for cooperating with the closing member of the packaging device, the coupling member being movable in rotation with the closing member of the collecting device, so that in the open position of the closing member and the coupling member of the collecting device, the balls from the packaging device pass through the openings of the closing member and the body of the packaging device and then the opening of the support of the collecting device before being transported to the collecting means.

The assembly may include indexing means capable of keeping the closing member of the collecting device in the open and closed positions respectively.

The indexing means may include an elastic member capable of resting on indexing zones projecting from the closing member.

BRIEF DESCRIPTION OF THE DRAWINGS

The invention will be better understood and other details, characteristics and advantages of the invention will become readily apparent upon reading the following description, given by way of a non limiting example with reference to the appended drawings, wherein:

FIGS. 27 and 28 are views corresponding respectively to FIGS. 16 and 18 showing a partially closed position, FIGS. 29 and 30 are views corresponding respectively to FIGS. 16 and 18 showing the final closed position.

DETAILED DESCRIPTION OF THE PREFERRED EMBODIMENTS

Figure 31:
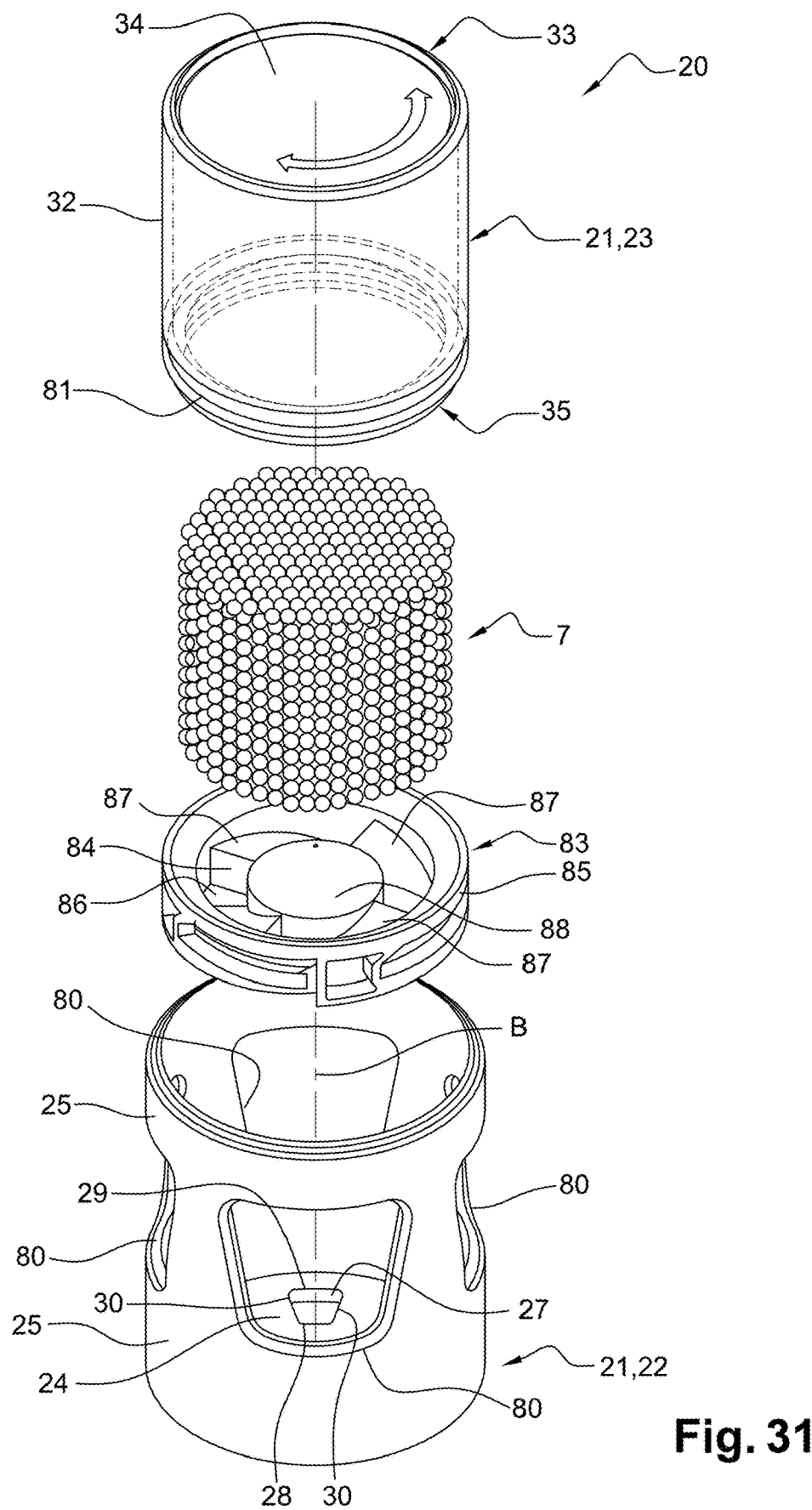
FIG. 31 is an exploded perspective view of a ball packaging device according to a second embodiment of the invention.
Figure 32:
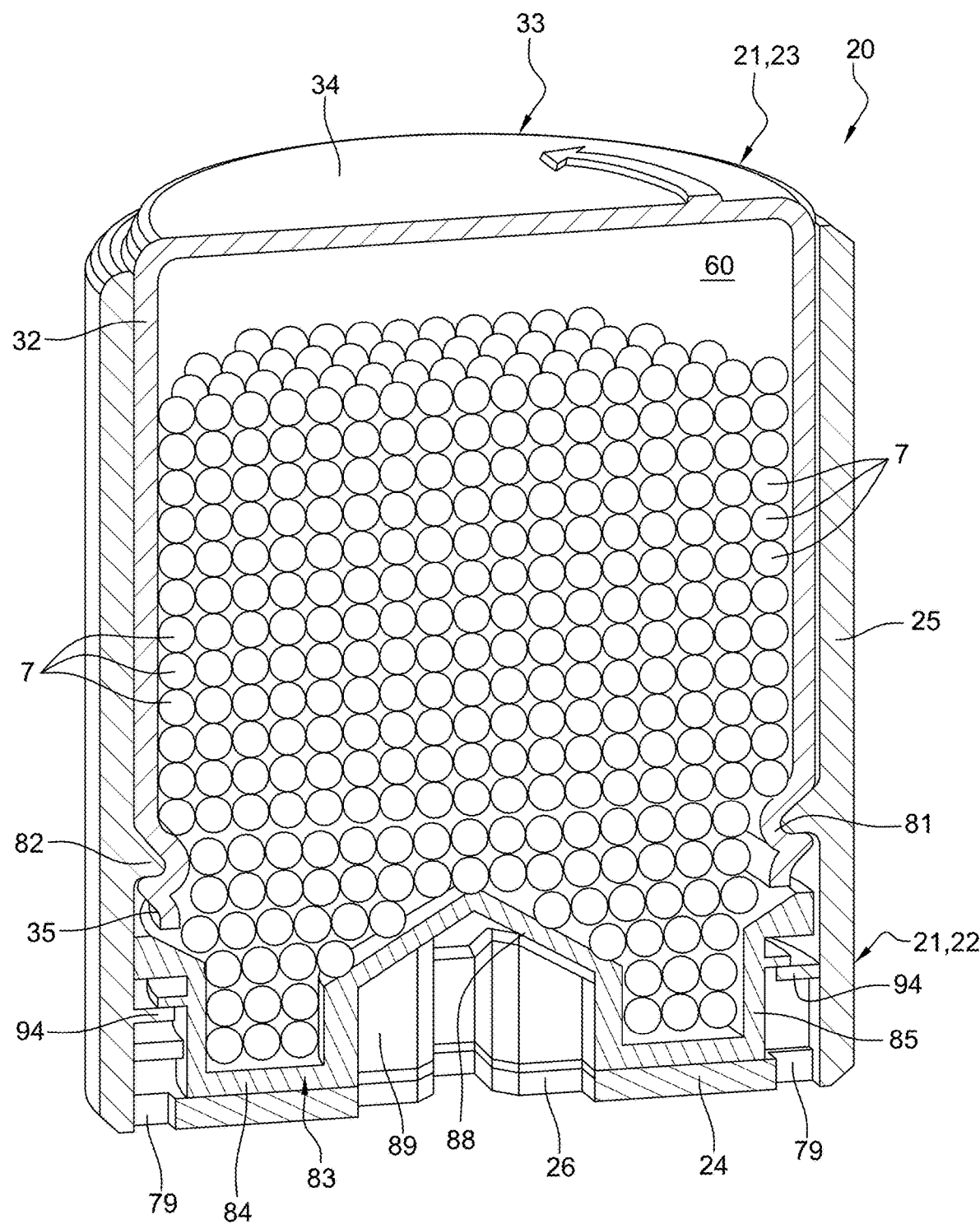
FIG. 32 is an axial section and perspective view of the device.
Figure 33:
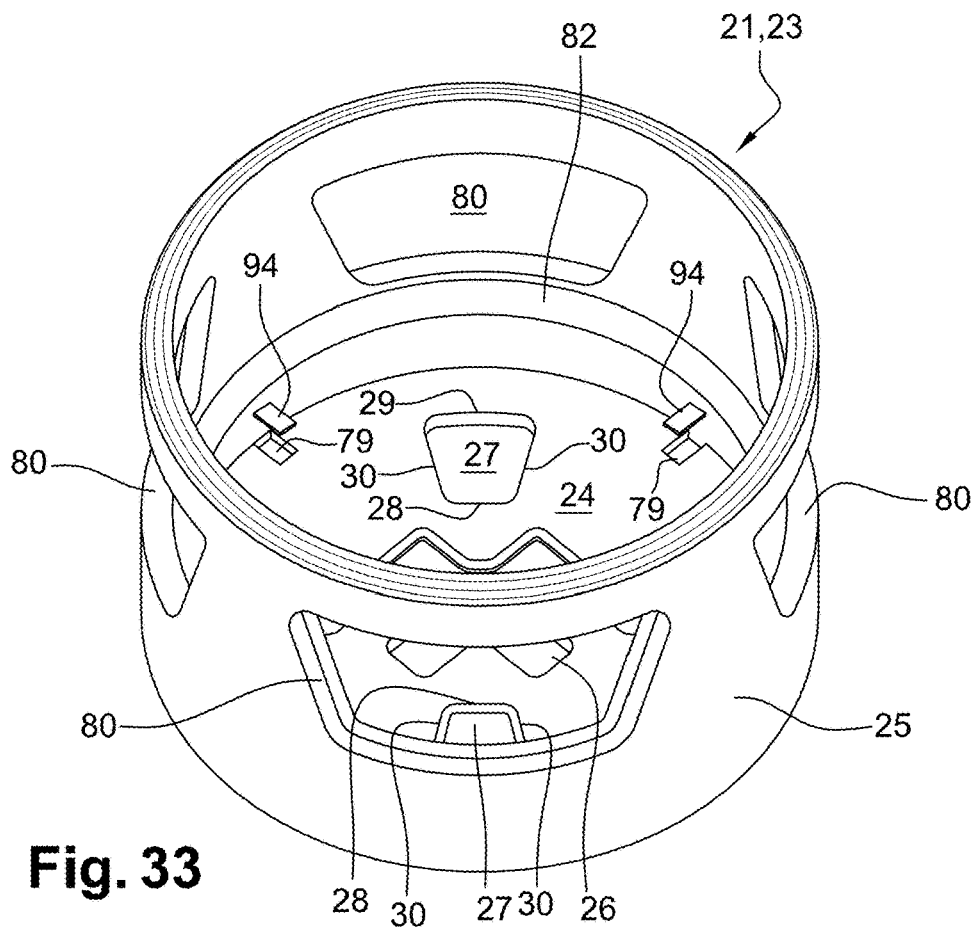
FIG. 33 is a perspective view of the first part of the body.
Figure 34:
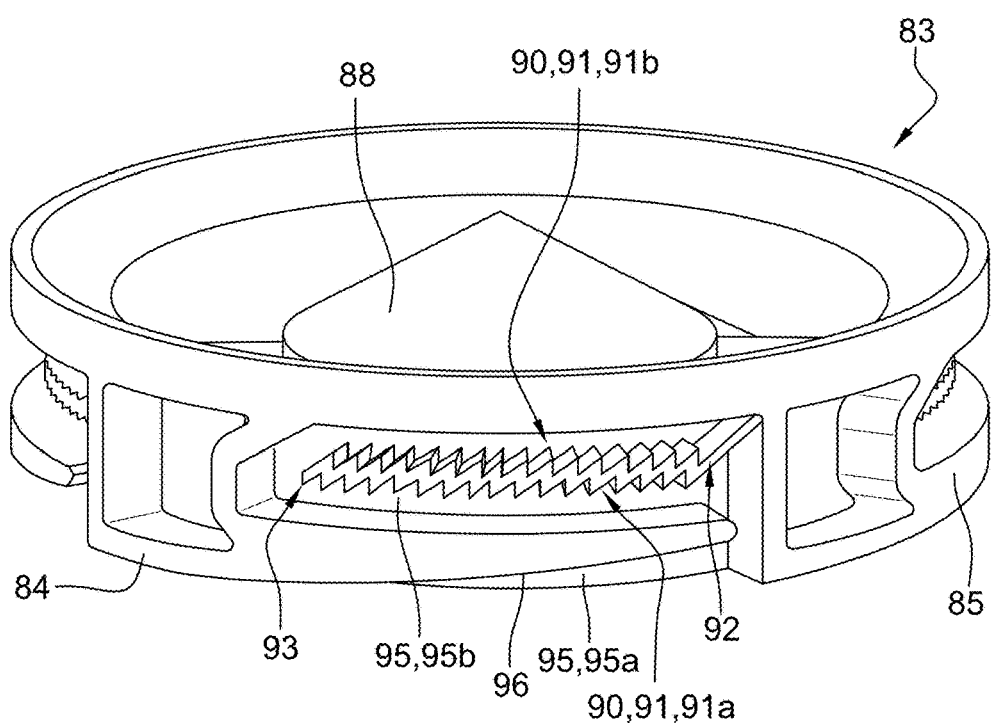
FIG. 34 is a perspective view of the closing member.
Figure 35:
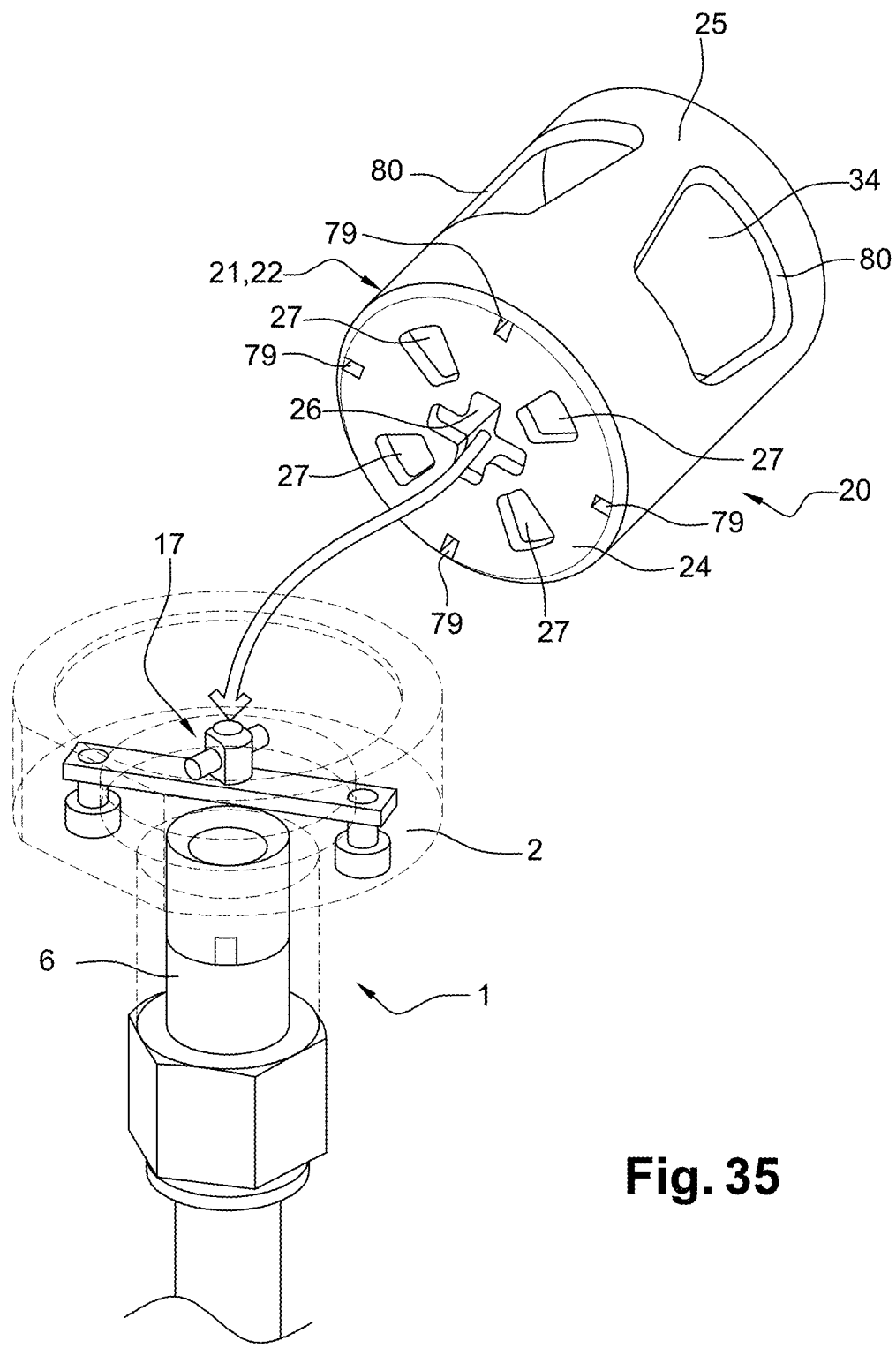
FIG. 35 is a perspective view illustrating the mounting of a device according to the invention on a coupling member of an analysis appliance.

FIGS. 1 to 5 represent a collecting device 1 of an analysis appliance. The collecting device 1 has a cylindrical support 2 with a housing 3 open at the top. The bottom surface 4 includes openings 5, here four, evenly distributed over the periphery. The device 1 also includes collecting means 6 capable of collecting balls 7 (FIGS. 31 and 32) through said openings 5. The support consists of a first part 2a and a second part 2b assembled together, for example, by screws 2c.

Figure 1:
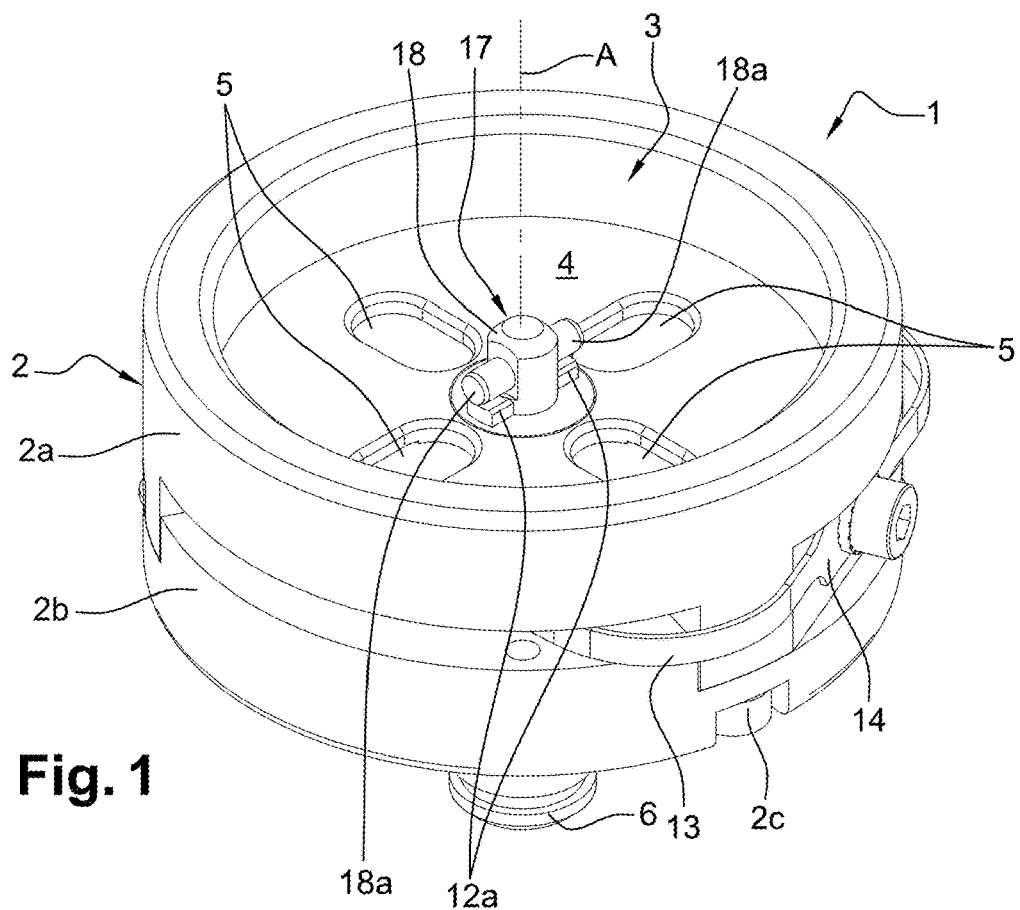
FIG. 1 is a perspective top view of a collecting device of an analysis appliance in the closed position.
Figure 2:
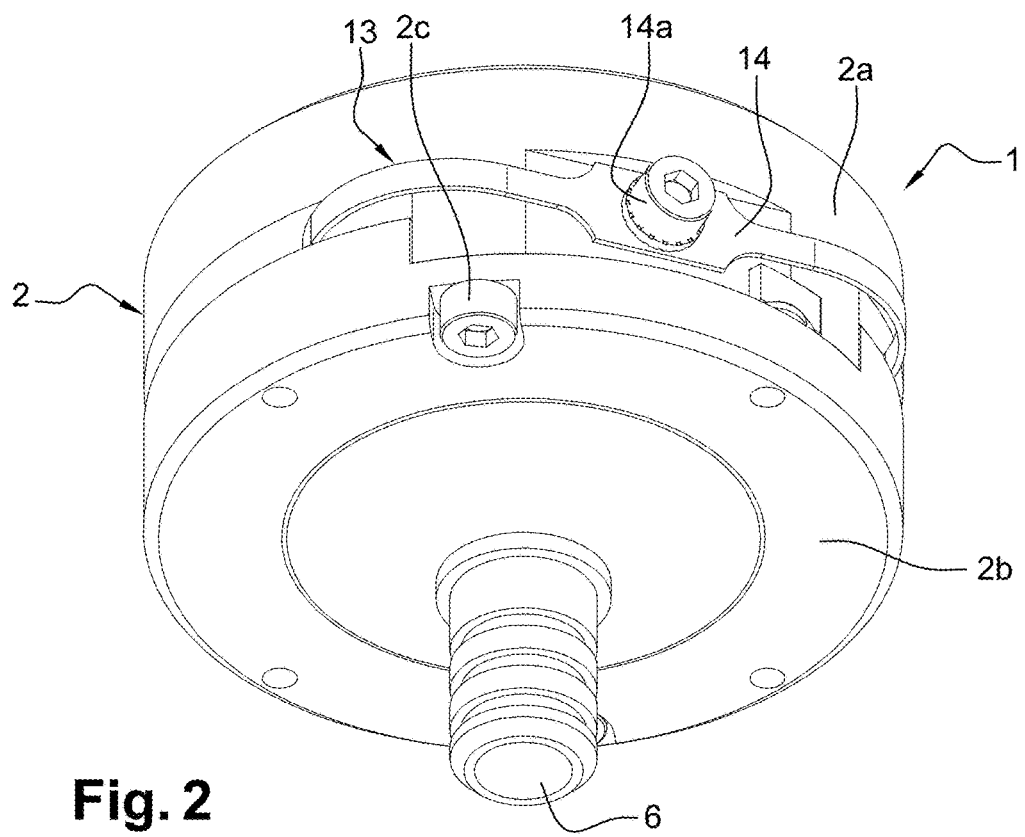
FIG. 2 is a perspective bottom view of a collecting device of an analysis appliance in the closed position.
Figure 3:
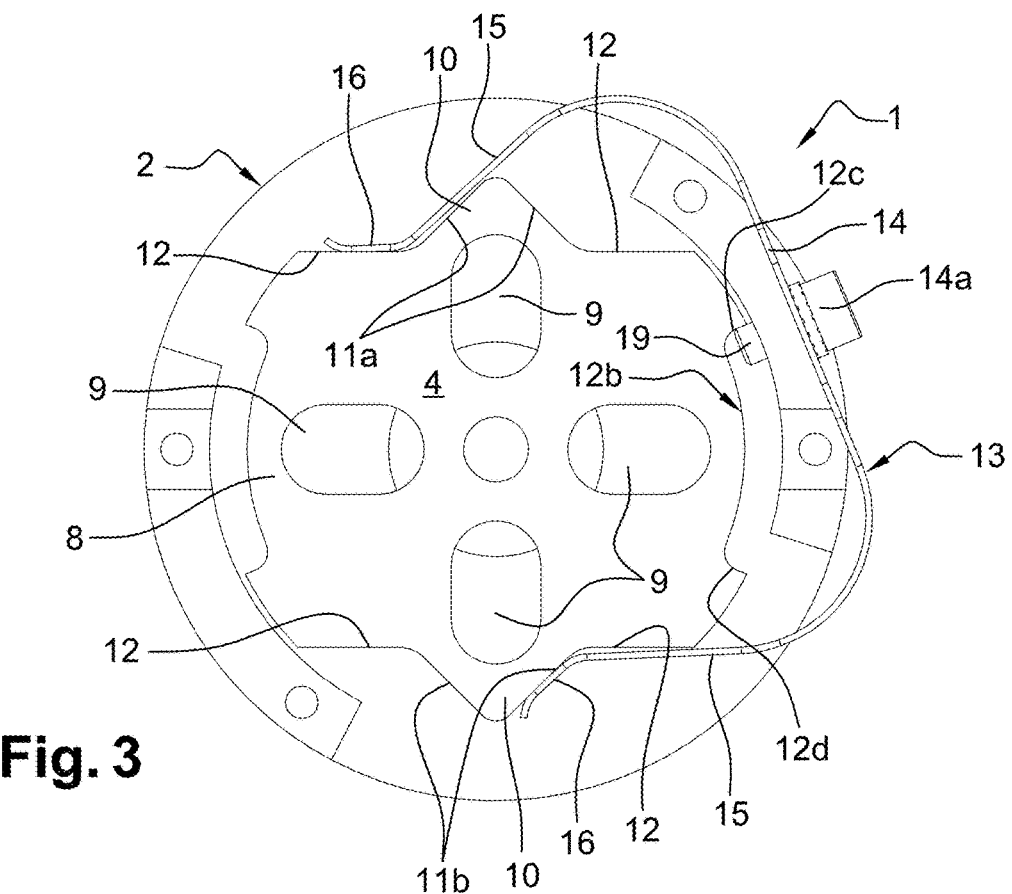
FIG. 3 is a radial sectional view of the collecting device shown in the closed position.
Figure 4:
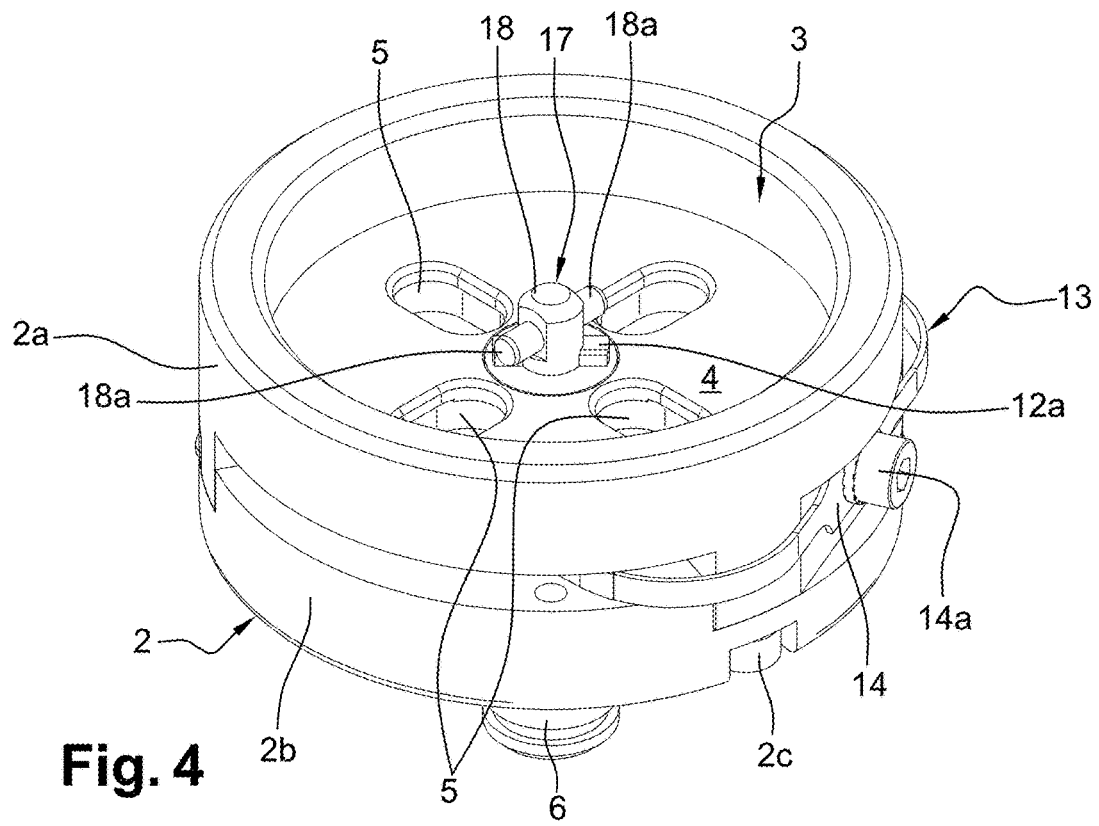
FIG. 4 is a perspective top view of a collecting device of an analysis appliance in the open position.
Figure 5:
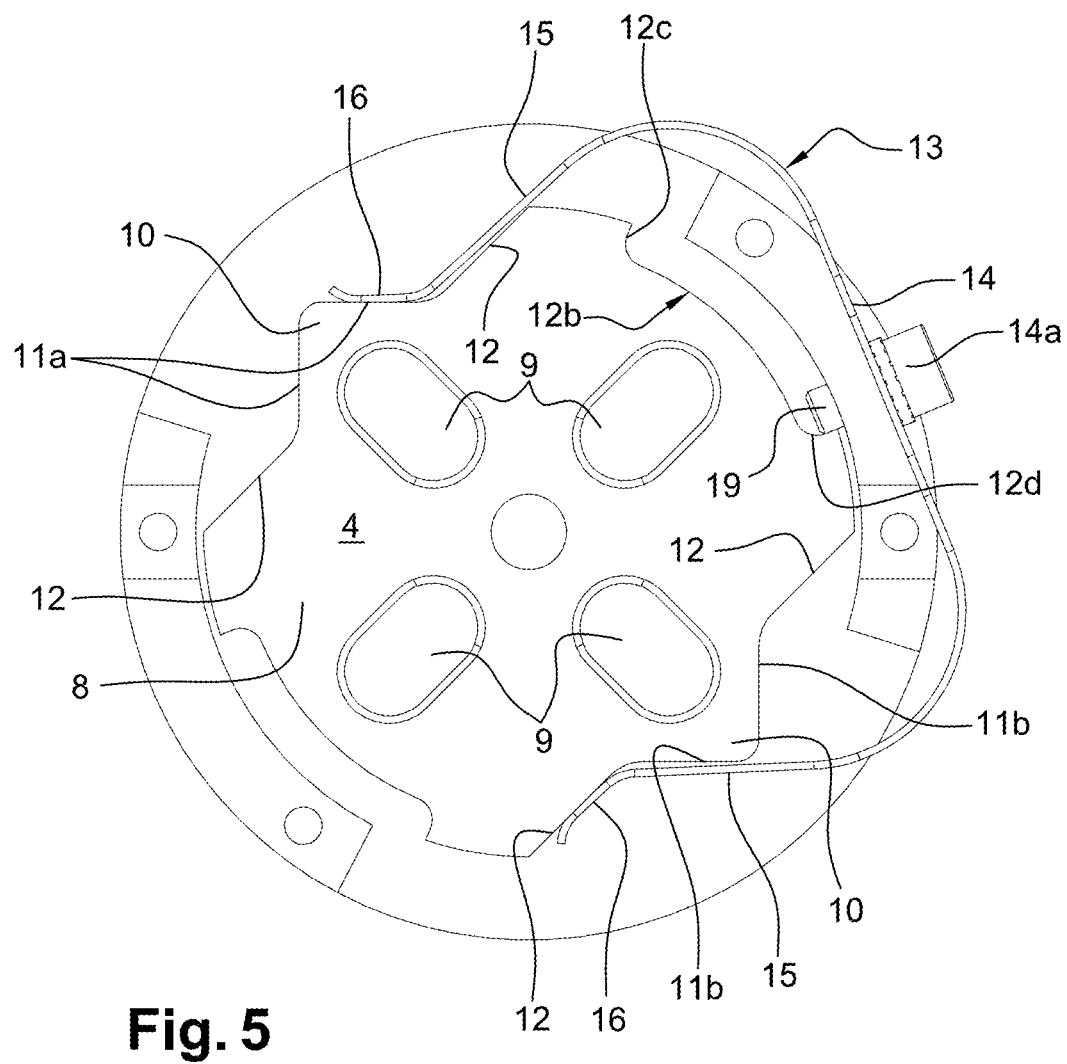
FIG. 5 is a radial sectional view of the collecting device shown in the open position
Figure 6:
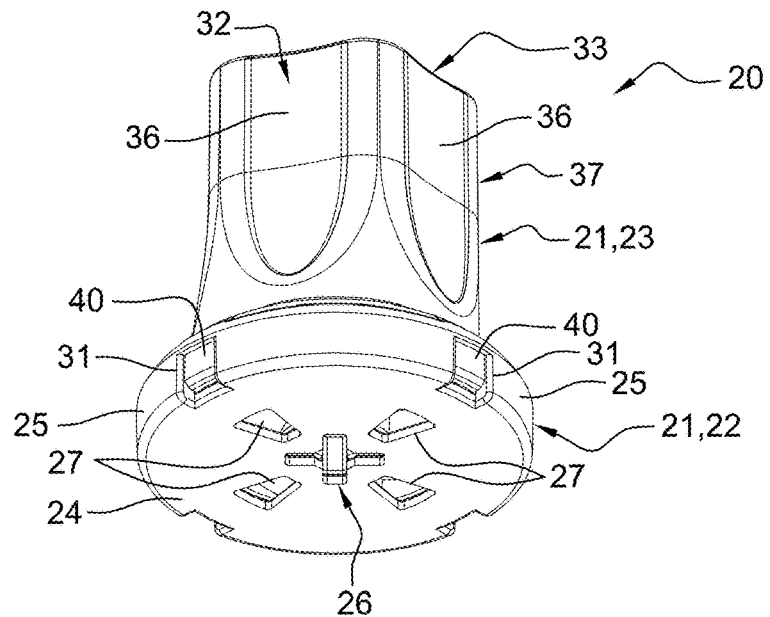
FIG. 6 is a perspective bottom view of a ball packaging device according to one first embodiment of the invention.
Figure 7:
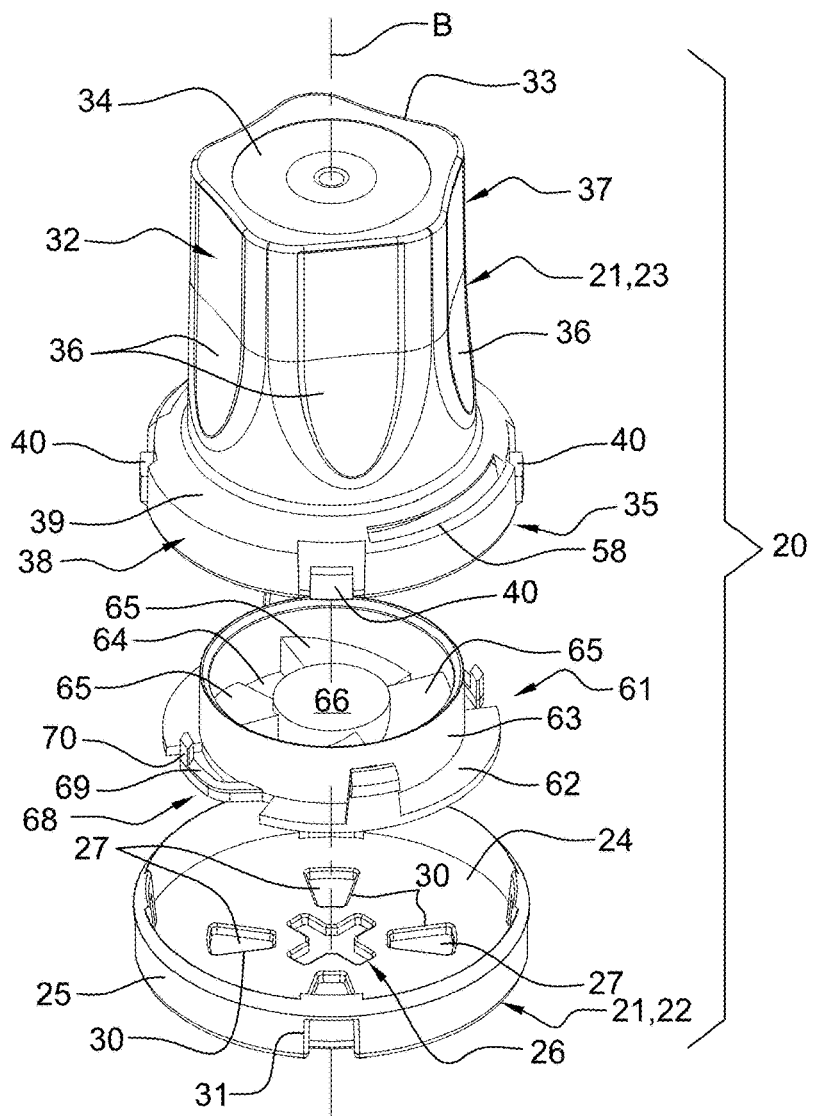
FIG. 7 is an exploded perspective view of the device of FIG. 6.

The collection device 1 also includes a closing member 8 that rotates about the axis of the support between a closed position shown in FIGS. 1 to 3 and an open position shown in FIGS. 4 and 5.

The closing member 8 is axially located between the first and second parts 2a, 2b of the support 2. The closing member 8 includes openings 9, here four, evenly distributed over the periphery. The closing member 8 further includes two opposite indexing zones 10 extending radially outwards. Each indexing zone 10 has two surfaces 11a, 11b inclined relative to each other and relative to the radial direction so as to have a V shape. The closing member 8 also has flat zones 12 extending on either side of the inclined surfaces 11a, 11b, here four flat zones. The flat zones 11a on the one hand and the flat zones 11b on the other hand extend in a first and second plane respectively.

The closing member 8 also has, in its centre, two projections 12a extending along the axis A, opposite the collecting means 6. These projections 12a form means for rotating the closing member 8.

Finally, the closing member 8 has at least one groove 12b on its radially outer periphery, whose circumferential ends 12c, 12d form stops.

The support 2 has additional indexing means 13. Said means 13 comprise an elastic member in the general shape of a U comprising a base 14 attached to the support 2, by a screw 14a, and two arms 15 whose ends 16 rest on the inclined surfaces 11a, 11b of the indexing zones 10 of the closing member 8.

Said ends 16 are curved radially outwards so as to adapt to the shape of the inclined surfaces 11a, 11b.

The cooperation of the indexing means 13 makes it possible to define two stable positions of the closing member 8, namely the closed position and the open position.

The collecting device 1 also includes a coupling member 17 with a general bayonet shape. The coupling member 17 has a pin 18 with an axis A, attached relative to the support 2, and two diametrically opposed fingers 18a extending radially outwards from the pin 18. The pin has a diameter of 2.5 mm and a length along the axis A of 10 mm for example.

In use, when the closing member 8 is in the closed position (FIGS. 1 to 3), the ends 16 of the branches 15 rest on the inclined surfaces 11a, 11b and/or on the flat zones 12 of the closing member 8.

When the closing member 8 is in the open position (FIGS. 4 and 5), the ends 16 of the branches 15 rest on the inclined surfaces 11a, 11b and/or on the flat zones 12 of the closing member 8.

The indexing means 13 prevent the accidental movement of the closing member 8, for example due to vibrations.

The end 19 of the screw 14a further forms a stop that cooperates with the ends 12c, 12d of the groove 12b to limit the angular displacement of the closing member 8 between its open and closed positions.

In the closed position shown in FIGS. 1 and 3, the body 19 of the screw 14a comes to rest against the end 12c of the groove 12b.

In the open position shown in FIGS. 4 and 5, the body 19 of the screw 14a comes to rest against the end 12d of the groove 12b.

FIGS. 6 to 15 represent a packaging device 20 for balls 7 for reaction vessels intended for an analysis appliance, according to a first embodiment of the invention.

The device 20 comprises a body 21 comprising a first part 22 and a second part 23.

The first part 22 has a disc-shaped bottom wall 24 and a cylindrical wall 25 extending along an axis B from the radially outer periphery of the bottom wall 24. The first part 22 forms a cover.

The bottom wall 24 has a central indentation 26, generally in the shape of a cross, for example a cross with four perpendicular branches two by two. The bottom wall 24 further has four openings 27, each opening 27 having a ring sector shape. Each opening 27 has a radially inner arc-shaped edge 28, a radially outer arc-shaped edge 29, and two radial edges 30 connecting the radially inner 28 and outer 29 edges.

Figure 38:
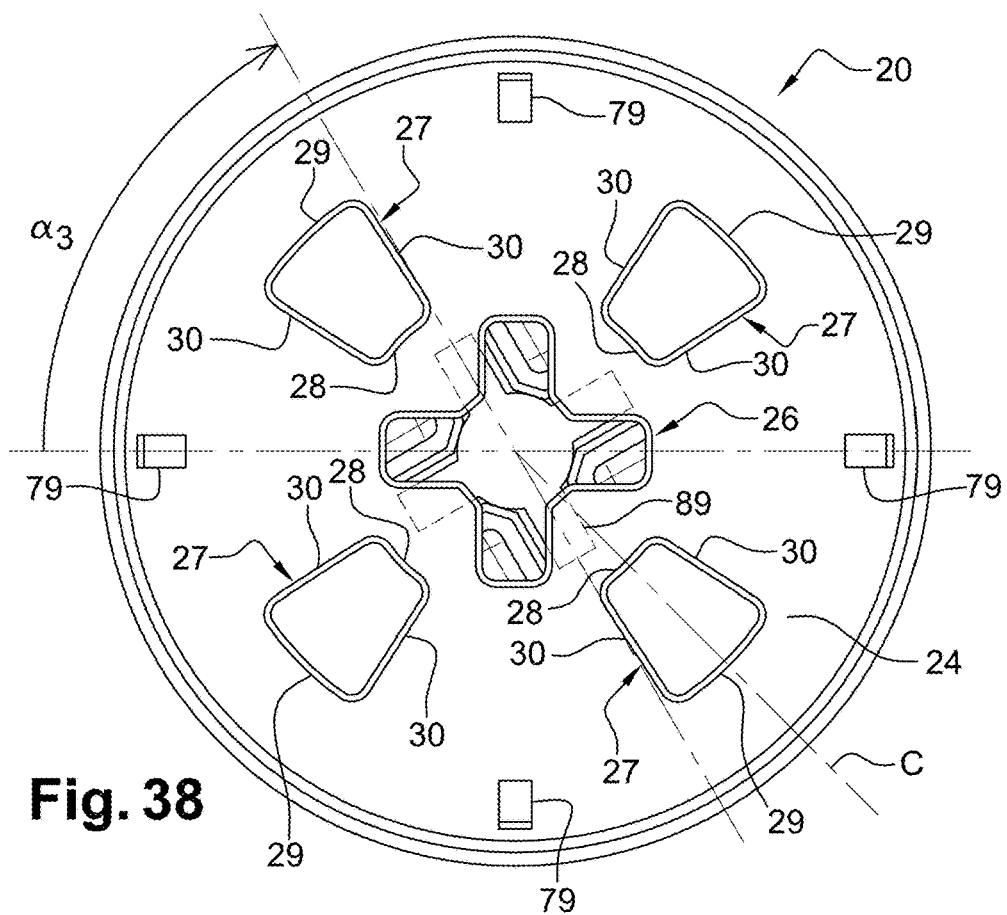
FIG. 38 is a view corresponding to FIG. 5, illustrating the device in the open position.

Each opening 27 extends along a radial centerline C (FIGS. 11 and 38), angularly offset from the branch axes, for example by about 45° in the case of a four branch indentation 26.

The cylindrical wall 25 has ports 31, here 4, evenly distributed around the circumference. Each port 31 has a general rectangular or square shape.

The second part 23 comprises a cylindrical wall 32 of axis B with a first end closed 33 by a bottom wall 34, and a second open end 35. The first end 33 is located opposite the bottom wall 24 of the first part 22 of the body 21.

The cylindrical wall 25 has flat zones or a polygonal 36, for example pentagonal shape, to facilitate gripping.

The cylindrical wall 25 has a first portion 37 located on the first end 33 side and a second portion 38 located on the second end 35 side, connected by a frustoconical connecting zone 39. The second portion 38 has a larger diameter than the first portion 37.

The cylindrical wall 32 of the second part 23, in particular the second part 38, is mounted in the cylindrical wall 25 of the first part 22.

The second portion 38 includes latching means 40, for example latching studs, intended to be engaged in the ports 31 of the first part of the body 22, so as to secure the first part 22 and the second part 23.

The axial end of the second portion 38, which is opposite the bottom wall, forms a supporting edge 41.

Two stop studs 42 axially extend from the supporting edge 41, said studs 42 being diametrically opposed.

Guide means include guide members 43 axially extending from the frustoconical zone 39 towards the end 35. The guide members 43 are diametrically opposed. Each guide member 43 has a radially outer surface 44 and a radially inner surface 45 extending circumferentially over an angular range between 10 and 90°, for example 40°. These surfaces 44, 45 form latching zones.

The radially outer surface 44 successively comprises, from a first circumferential end 46 to a second circumferential end 47:
- an oblique zone 48 relative to the radial direction, facing radially outwards,
- an zone in the shape of an arc of a circle 49,
- an oblique zone 50 relative to the radial direction, facing radially inwards,
- an zone in the shape of an arc of a circle 51,
- an oblique zone 52 relative to the radial direction, facing radially outwards, and
- an zone in the shape of an arc of a circle 53.

The radially inner surface 45 successively comprises, from the second end 47 to the first end 46:
- an oblique zone 54 relative to the radial direction, facing radially inwards,
- an zone in the shape of an arc of a circle 55,
- an oblique zone 56 relative to the radial direction, facing radially outwards,
- an zone in the shape of an arc of a circle 57.

Alternatively, oblique zones 50, 52 and 56 can be replaced by radially extending zones.

The radially outer surface 44 and the radially inner surface 45 are connected to each other at the first end 46 by the oblique zone 48 and the arc-shaped zone 57.

The radially outer surface 44 and the radially inner surface 45 are connected to each other at the second end 47 by the arc-shaped zone 53 and the oblique zone 54.

The frustoconical zone 39 also has arc-shaped ports 58, each port 58 extending over an angular range between 10 and 90°, for example 70°. For example, there are two ports 58 and they are diametrically opposed. The second portion 38 of the cylindrical wall 32 has grooves 59 (FIG. 9) in the shape of an arc of a circle, each groove 59 extending circumferentially along a port 58 of the frustoconical zone 39.

An internal volume 60 is delimited between the cylindrical wall 32 and the bottom wall 34 of the second part 23, on the one hand, and the bottom wall 24 of the first part 22, on the other hand.

The device 20 also includes an annular closing member 61, of axis B, mounted in the aforementioned internal volume 60, on the bottom wall side 24 of the first part 22. The closing member 61 is pivotably mounted about the axis B, relative to the body 21.

The closing member 61 has a disc-shaped bottom wall 62 and a generally cylindrical wall 63, extending from the bottom wall 62 and displaced radially inwardly relative to the radially outer periphery of the bottom wall 62.

The bottom wall 62 has four openings 64, each opening 64 having a ring sector shape. The bottom wall 62 also has four inclined surfaces 65 in the form of helix portions, and a central conical part 66. Each inclined surface 65 has a lower end, i.e. close to the bottom wall 24 of the first part 22 of the body 21, the lower end forming an edge of one of the openings 64 of the closing member 61.

Each inclined surface 65 extends over an angular range of about 65°, for example.

Each opening 64, 27 of the closing member 61 and/or the bottom wall 24 of the first element 22 extends over an angular range of the order of 25°, for example.

The closing member 61 can be moved in rotation between an open position in which the openings 64 of the closing member 61 and the openings 27 of the body 21 are located opposite each other, and a closed position in which the openings 64 of the closing member 61 are completely spaced from the openings 27 of the body 21. A partial opening or closing is defined as a position of the closing member 61 in which the openings 64 of the latter are located, in part only, opposite the openings 27 of the body 21. In other words,
- in the closed position, the openings 27 of the body 21 are completely closed,
- in the open position, the openings 27 of the body 21 are fully open,
- in partially open or partially closed position, a part of each opening 27 of the body 21 is closed and a part of each opening 27 of the body 21 is open.

The closing member 61 also has an indentation 67 similar in shape to that of the indentation 26 of the body 21, located opposite said indentation 26 of the body 21 in the closed position of the closing member 61 relative to the body 21.

The closing member 61 also includes a tab 68 with a connecting arm 69 and a latching end 70. The tab 68 is housed in a notch 71 in the bottom wall 61. The connecting arm 69 comprises a first part 72 extending radially outward from the cylindrical surface and a second part 73 extending circumferentially from the first part 72. Said first part 72 is inclined relative to the radial direction, for example by an angle between 30 and 60°. The second part 73 extends circumferentially at an angle between 10 and 45°, the free end of the second part 73 forming the latching end 70. The tab 68 belongs to the guide means, the latching end 70 being able to cooperate with the radially outer surface 44 and the radially inner surface 45 as explained below.

The latching end 70 has a radially inner surface 74 and a radially outer surface 75 extending in the circumferential direction and two inclined surfaces 76 relative to the circumferential direction and relative to the radial direction. Said surfaces 76 are inclined at an angle between 30° and 60° to the radial direction, for example at an angle of 45°.

The closing member 61 also has spacer studs 77 extending radially outwards from the cylindrical surface 63. For example, there are two spacer studs 77, which are diametrically opposed.

In addition, the closing member 61 has latching means 78, in this case latching tabs. Each latching tab 78 axially extends from the radially outer periphery of the bottom wall 62.

Each latching tab 78 engages in a groove 59 and/or a port 58 of the second part 23 of the body 21, so as to ensure the latching assembly of the closing 61 relative to the body 21, while allowing an angular displacement of the closing member 61 relative to the body 21. During such assembly, each spacer stud 77 rests on the supporting edge 41.

The latching tab 68 and the guide member 43 are able to cooperate with each other in such a way that the closing member 61 can be rotated relative to the body 21 only from an initial closed position to an open position and then only from the open position to a final closed position.

The first 22 and second 23 parts of the body 21 as well as the closing member 61 are made of synthetic material. The second part 22 of the body 21 can be made of a transparent material. The said second part 22 can, as an alternative, be made of glass for example.

The internal volume 60 contains balls 7 to be placed in reaction vessels for the analysis appliance. The balls 7, for example, have a diameter between 1 and 2 mm.

During operation, the packaging device 20 is mounted in a ball charging zone 7 of the analysis appliance, in particular on the collecting device 1 of the analysis appliance.

The packaging device 20, in the initial closed position, is mounted on the support 2 and on the stationary coupling member 17. The latter penetrates into the indentation 67 of the closing member 61, through the indentation 26 of the first part 22 of the body 21, the two indentations 26, 67 being aligned with each other. Similarly, the openings 64 of the closing member 61 and the openings 5 of the support 2 are located opposite each other.

In addition, the projections 12a of the closing member 8 are engaged in the indentation 26 of the first part 22 of the body 21, so as to achieve a rotational coupling of the closing member 8 and the body 21.

The operator then rotates the body 21 manually. The closing member 61 is held stationary by the attached coupling element 17 and the closing member 8 is driven in rotation by the body 21.

During this pivoting, the openings 27, 64 are gradually released or opened, by partial or total alignment of the openings 64, 27 of the closing member 61 and the body 21. During this opening phase, each latching end 70 of the closing member 61 moves along the radially outer surface 44 of the guide member 43 of the body 21, by elastic deformation of the connecting arm 69 of the tab 68

Figure 17:
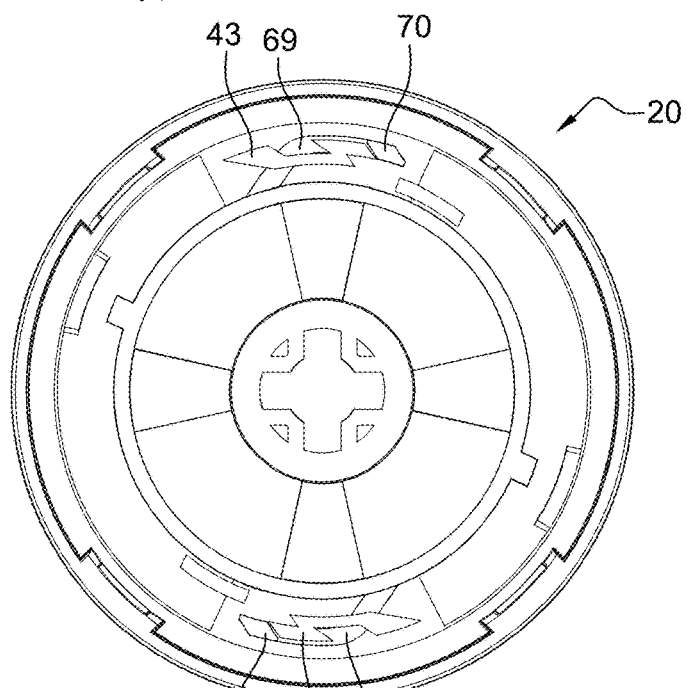
FIG. 17 is a radial cross-sectional view of said device in the initial closed position.
Figure 18:
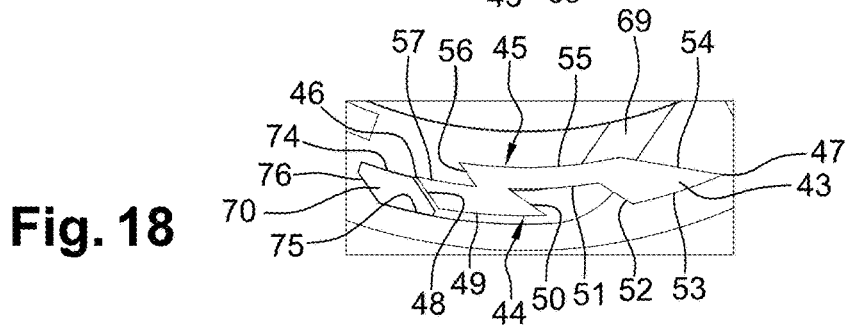
FIG. 18 is a detailed view of a zone of FIG. 17, FIGS. 19, 20; 21, 22; 23, 24 are views corresponding respectively to FIGS. 16 and 18, showing several successive intermediate opening positions.
Figure 23:
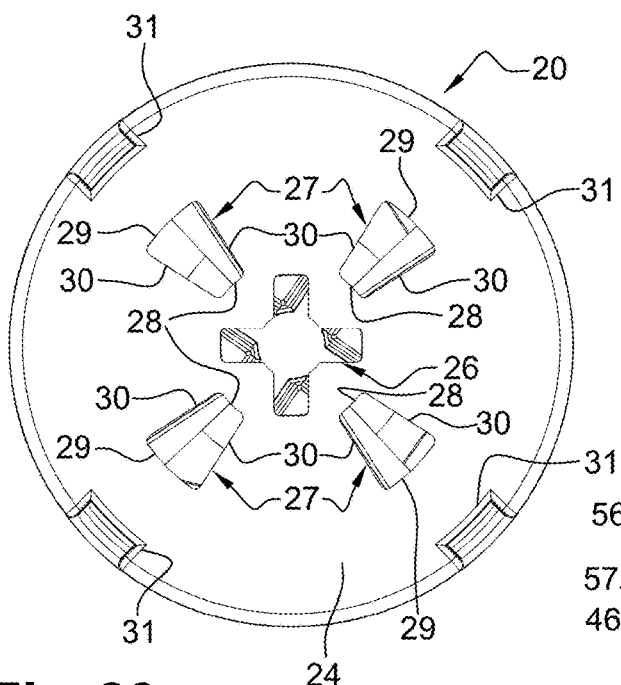
Figure 24:
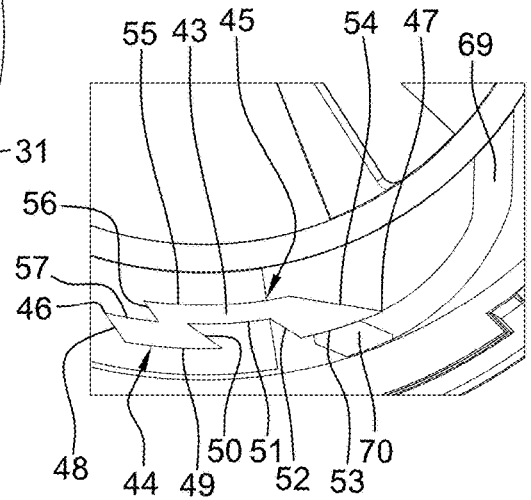

The latching end 70 of the tab 68 thus moves successively from the initial closed position to the open position along:
- the oblique zone 48 (FIGS. 17 and 18),
- the arc-shaped zone 49 (FIG. 20),
- the arc-shaped zone 51 (FIG. 22),
- an oblique zone 52, and
- an arc-shaped zone 53 (FIG. 24).

In the partially open position shown in FIGS. 21 and 22, the return of the body 21 to the closed position relative to the closing member 61 is prevented by pressing the latching end 70 against the oblique zone 50.

Thus, only an opening movement is allowed, i.e. a movement of the latching end 70 from the first end 46 to the second end 47 of the guide member 43.

Figure 25:
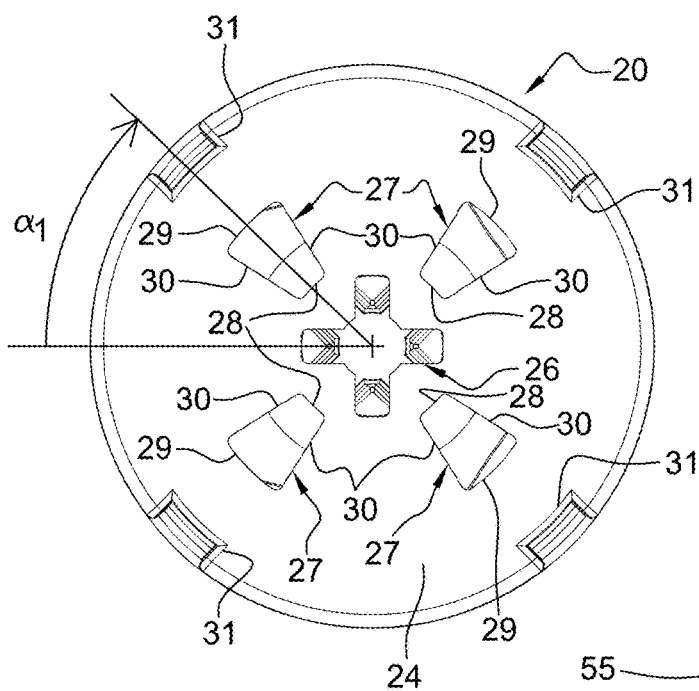
FIGS. 25 and 26 are views corresponding respectively to FIGS. 16 and 18 showing the fully open position.
Figure 26:
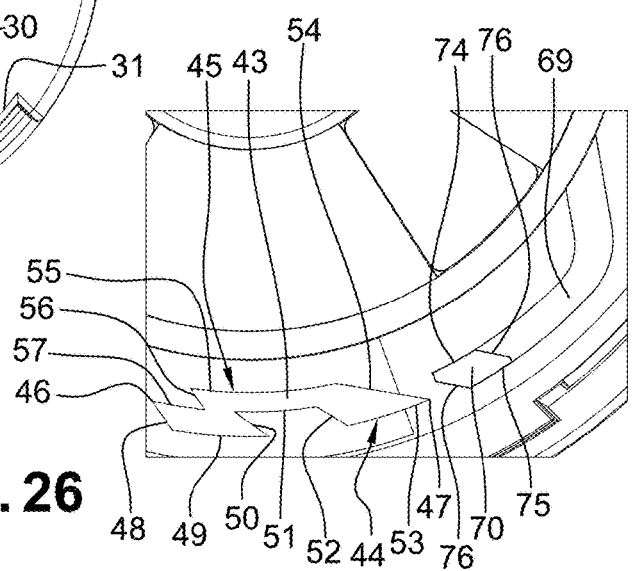

FIGS. 25 and 26 illustrate the fully open position of the body 21 in relation to the closing member 61.

In addition, when opening the device 20, the indentations 26, 67 of the body 21 and the closing member 61 are no longer aligned with each other, so that the removal of device 20 from the support 2 and the coupling member 17 is prevented.

Figure 16:
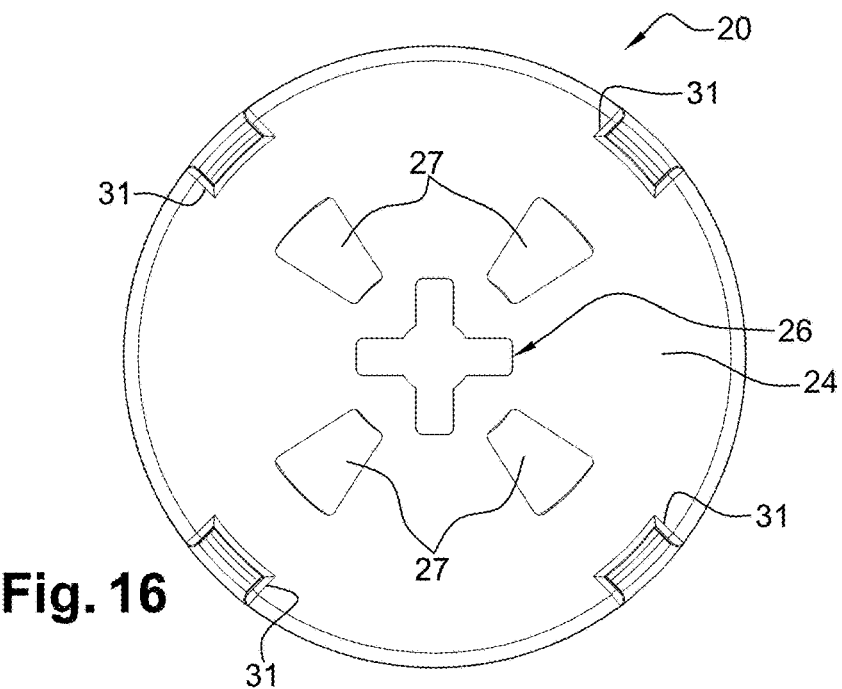
FIG. 16 is a bottom view of the packaging device, in an initial closed position.

In the initial closed position (FIGS. 16 to 18), each latching tab 70 of the closing member 61 comes to rest on the corresponding circumferential end of the groove 59 of the body 21.

In the open position (FIGS. 25 and 26), each latching tab 68 of the closing member 61 comes to rest on the other circumferential end of the groove 59 of the body 21.

In the open position, the openings 64, 27, 5 of the closing member 61, the body 21 and the support 2 are fully aligned or facing each other.

The total allowed displacement a1 between the open and closed positions is for example between 15° and 90°, for example around 45°.

The dispensing of balls 7 may be permitted for a partial opening of the device 20, i.e. if the angle of rotation of the closing member 61 relative to the body 21 is greater than a specified value, for example between 0 and 45°, in particular 35°. This position is shown in FIGS. 21 and 22. It should be noted that from this intermediate position, it is no longer possible to return to the initial closed position.

The dispensed balls 7 are recovered and stored in the recharging zone of the analysis appliance. The inclined walls 65 and the central conical part 66 facilitate the dispensing of the balls 7 by directing them by gravity towards the openings 4. The balls 7 are then used to be automatically introduced into the reaction vessels.

From the open position shown in FIGS. 25 and 26, when all the balls 7 have been dispensed from the internal volume 60 of the device 20, the operator can close the device 20 by manually rotating the body 21 in the direction opposite the opening direction.

During this closing phase, due to the inclination of the surface 76 of the latching end 70 and the oblique zone 54 of the guide member 43, the latching end 70 successively slides along:
- the oblique zone 54,
- the arc-shaped zone 45 (FIGS. 27 and 28), and
- the arc-shaped zone 57 (FIGS. 29 and 30).

FIGS. 27 and 28 show a partial closing position and FIGS. 29 and 30 show a total or final closing position of the packaging device 20.

Once the final closing position is reached, it is no longer possible to open the packaging device 20 again for later use. Indeed, the displacement of the latching end 70 is prevented in the opening direction by the oblique zone 56.

It should also be noted that in the final closing position, the latching end 70 presses against the stop stud 42 so that it does not return to its initial closed position.

In other words, the device 20 is for single use only. This property is reinforced by the fact that the additional latching means 78 of the first part 22 of the body 21 and the second part 23 of the body 21 prevent the disassembly thereof.

FIGS. 31 to 34 represent a packaging device 20 for balls 7 for reaction vessels intended for an analysis appliance, according to a second embodiment of the invention.

The identical elements of the first and second embodiments are designated using the same numerical references.

The device 20 comprises a support 21 comprising a first part 22 and a second part 23.

The first part 22 has a disc-shaped bottom wall 24 and a cylindrical wall 25 extending along an axis B from the radially outer periphery of the bottom wall 24.

The bottom wall 24 has a central indentation 26, generally in the shape of a cross, for example a cross with four perpendicular branches two by two. The bottom wall 24 further has four openings 27, each opening 27 having a ring sector shape. Each opening 27 has a radially inner arc-shaped edge 28, a radially outer arc-shaped edge 29, and two radial edges 30 connecting the radially inner 28 and outer 29 edges.

Each opening 27 extends along a radial centerline C (FIG. 38), angularly offset from the branch axes, for example by about 45° in the case of an indentation 26 with four branches.

The bottom wall 24 also has holes 79 having a rectangular cross-section, provided on the radially outer periphery of the bottom wall 24. These holes 79 allow the manufacture of certain elements of the first part 22 of the body 21, in particular when the first part 22 of the body 21 is obtained by injection moulding.

The cylindrical wall 25 has ports 80, here 4, evenly distributed around the circumference. Each port 80 has a general trapezoidal shape. The second part 23 comprises a cylindrical wall 32 of axis B with a first end closed 33 by a bottom wall 34, and a second open end 35. The first end 33 is located opposite the bottom wall 24 of the first part 22 of the body 21.

The cylindrical part 32 of the second part 23 is mounted in the cylindrical part 25 of the bottom wall 22.

The cylindrical wall 32 of the second part 23 has, near its second end 35, latching means 81 capable of cooperating with complementary latching means 82 provided on the inner surface of the cylindrical wall 25 of the first part 22 of the body 21.

In particular, the cylindrical wall 32 of the second part 23 has an annular groove cooperating with a projecting annular zone forming a hook section of the first part 22.

The sections of the groove and the projecting annular zone are designed to allow latching of said parts 22, 23 and prevent the second part 23 from being removed from the first part 22 after latching of said parts 22, 23.

An internal volume 60 is delimited between the cylindrical wall 32 and the bottom wall 34 of the second part 23, on the one hand, and the bottom wall 24 and the cylindrical wall 25 of the first part 22, on the other hand.

The device 20 also includes an annular closing member 83, of axis B, mounted in the aforementioned internal volume 60, on the bottom wall side 24 of the first part 22. The closing member 83 is pivotably mounted about the axis B, relative to the body 21.

The closing member 83 has a disc-shaped bottom wall 84 and a generally cylindrical wall 85, extending from the radially outer periphery of the bottom wall 84.

The bottom wall 84 has four openings 86 (FIG. 31), each opening 86 having a ring sector shape. The bottom wall 84 also has four inclined surfaces in the form of helix sections 87, and a central conical part 88. Each helix portion 87 has a low end, i.e. close to the bottom wall 84 of the first part 22 of the body 21, the low end forming an edge of one of the openings 86 of the closing member 83.

Each helix portion 87 extends over an angular range of about 65°, for example.

Each opening 86, 27 of the closing member 83 and/or the bottom wall 24 of the first part 22, extends over an angular range of the order of 25°, for example.

The closing member 83 can be moved in rotation between an open position in which the openings 86 of the closing member 83 and the openings 27 of the body 21 are located opposite each other, and a closed position in which the openings 86 of the closing member 83 are completely spaced from the openings 27 of the body 21. A partial opening or closing is defined as a position of the closing member 83 in which the openings 86 of the latter are located, in part only, opposite the openings 27 of the body 21. In other words, in the closed position, the openings 27 of the body 21 are completely closed,
in the open position, the openings 27 of the body 21 are fully open,
in partially open or partially closed position, a part of each opening 27 of the body 21 is closed and a part of each opening 27 of the body 21 is open.

The closing member 83 also has an indentation 89 similar in shape to that of the indentation 26 of the body 21, located opposite said indentation 26 of the body 21 in the closed position of the closing member 83 relative to the body 21.

The closing member 83 and the first part 22 of the body 21 have guide means 90 allowing the closing member 83 to rotate relative to the body 21, only from an initial closed position to an open position and then only from the open position to a final closed position.

For this purpose, the closing member 83 comprises at least one guide member 91 or a toothed part 91 extending in a radial plane, here four toothed parts 91 evenly distributed over the circumference. Each toothed part 91 has a first end 92 and a second end 93. Each toothed part 91 has a first toothed zone 91a facing the bottom wall 24 of the first part 22, and a second toothed zone 91b, opposite the first toothed zone 91a. Each toothed part 91 is capable of cooperating with an elastic tab 94 extending radially inward from the cylindrical wall 25 of the first part 22 of the body 21.

The closing member 83 has channels 95 for inserting and receiving the elastic tabs 94, each channel 95 having a first part 95a and a second part 95b. The first part 95a is bounded by a surface inclined 96 relative to the radial plane, the tab 94 being guided by said inclined surface 96 when it is introduced into the channel 95. The second part 95b has, in front view, a general C-shape surrounding the corresponding toothed part 91.

The first part 95a and the second part 95b of the channel 95 are connected by a connecting zone 97 located opposite the first end 92 of the toothed part 91.

Each toothed zone 91 extends generally in a radial plane, each tooth of the toothed zone 91 having a surface inclined 98 relative to the corresponding radial plane and a stop surface 99 extending generally perpendicular to the radial plane.

In addition, each tab 94 is oriented in a plane inclined relative to the radial plane, the orientation of the tab 94 being similar to that of the inclined surfaces 99 of the teeth.

The first 22 and second 23 parts of the body 21 as well as the closing member 83 are made of synthetic material. The second part 23 of the body 21 can be made of a transparent material. The said second part 22 can, as an alternative, be made of glass for example.

The internal volume 60 contains balls 7 to be placed in reaction vessels for the analysis appliance.

In operation, the device 20 is mounted in a ball 7 collecting device 1 of the analysis appliance. In particular, the analysis appliance has a coupling member 17 and a support 2 comprising collecting means 6 capable of collecting the balls 7 housed in the device 20.

The device 20, in the initial closed position, is mounted on the support 2 and on the coupling element 17. The latter penetrates into the indentation 89 of the closing member 83, through the indentation 26 of the first part 22 of the body 21, the two indentations 26, 89 being aligned with each other.

The operator then rotates the body 21 manually. The closing member 83, which is rotatably coupled to the stationary coupling element 17, thus relatively rotates relative to the body 21.

Figure 39:
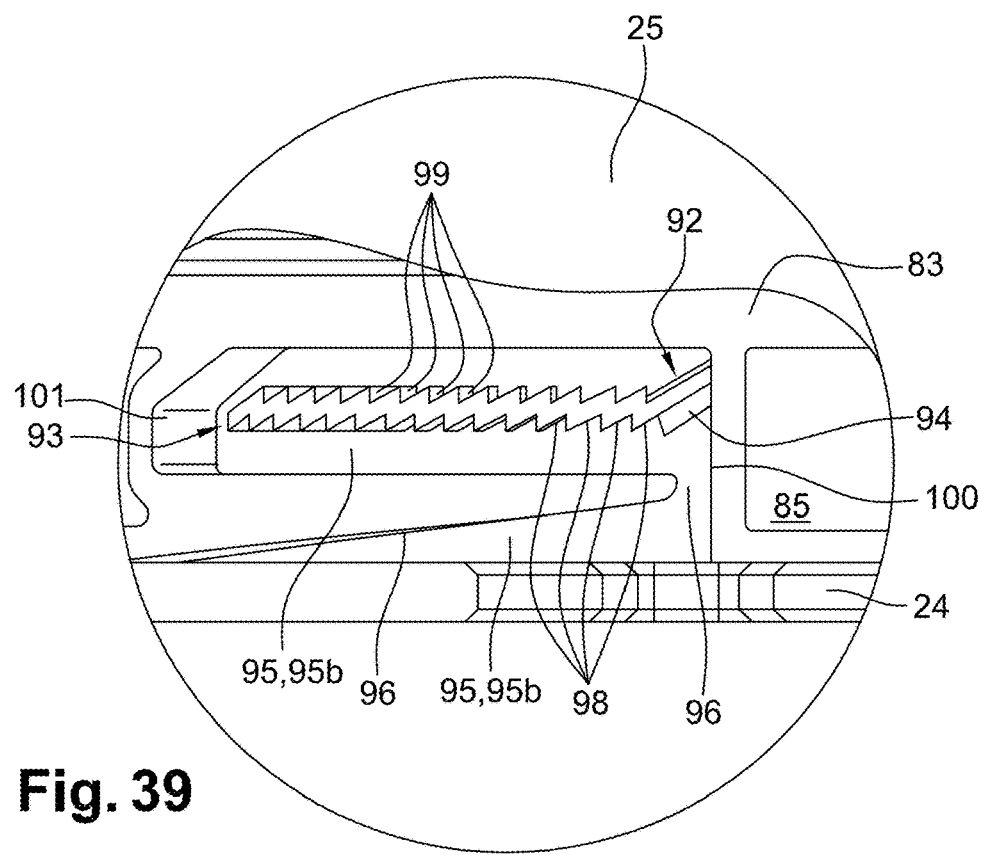
FIGS. 39 to 43 are views illustrating the guide means, in different successive positions, from the initial closed position to the final closed position.
Figure 40:
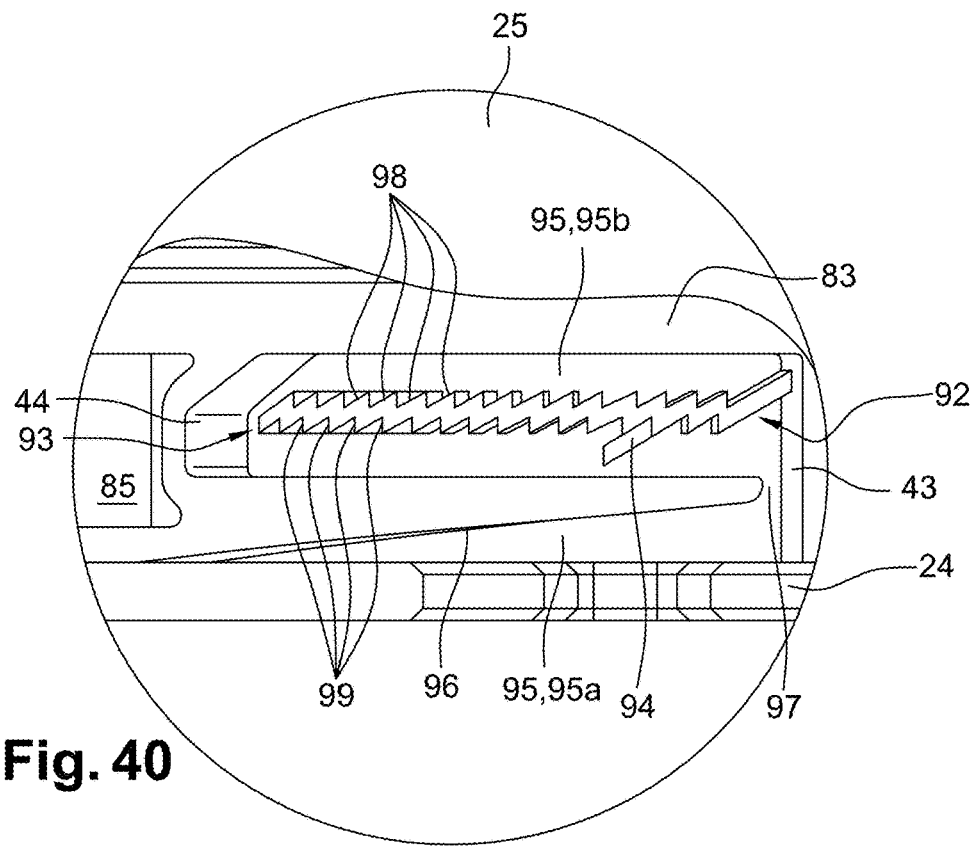
Figure 41:
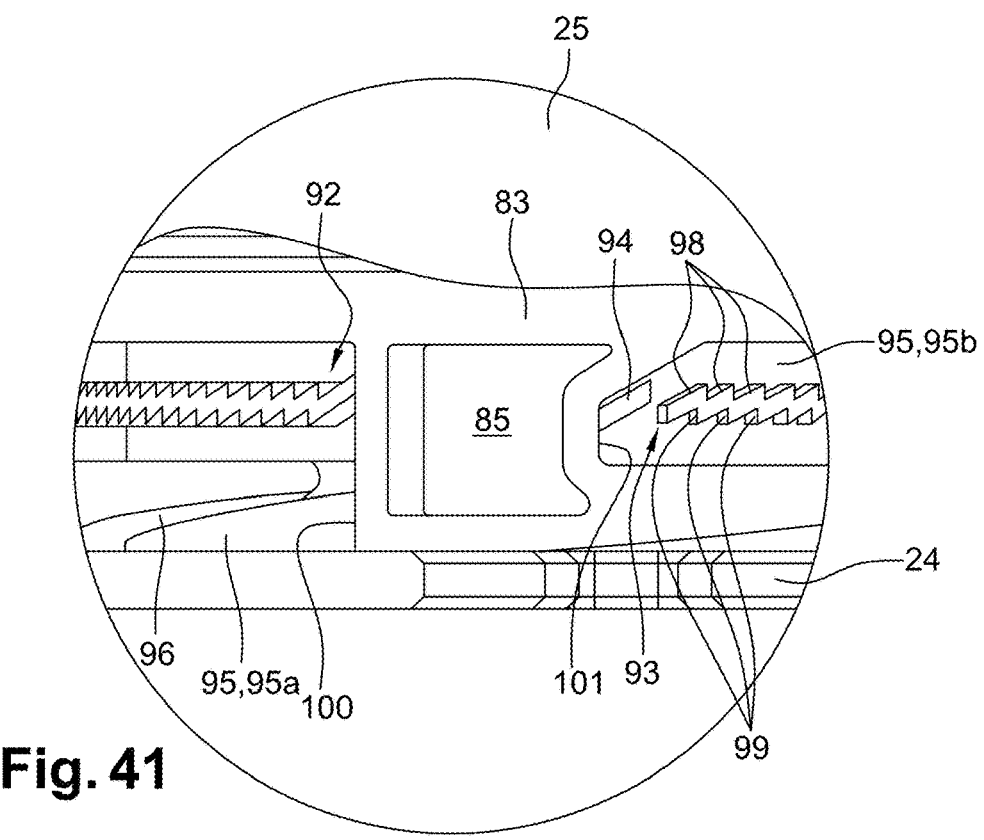
Figure 42:
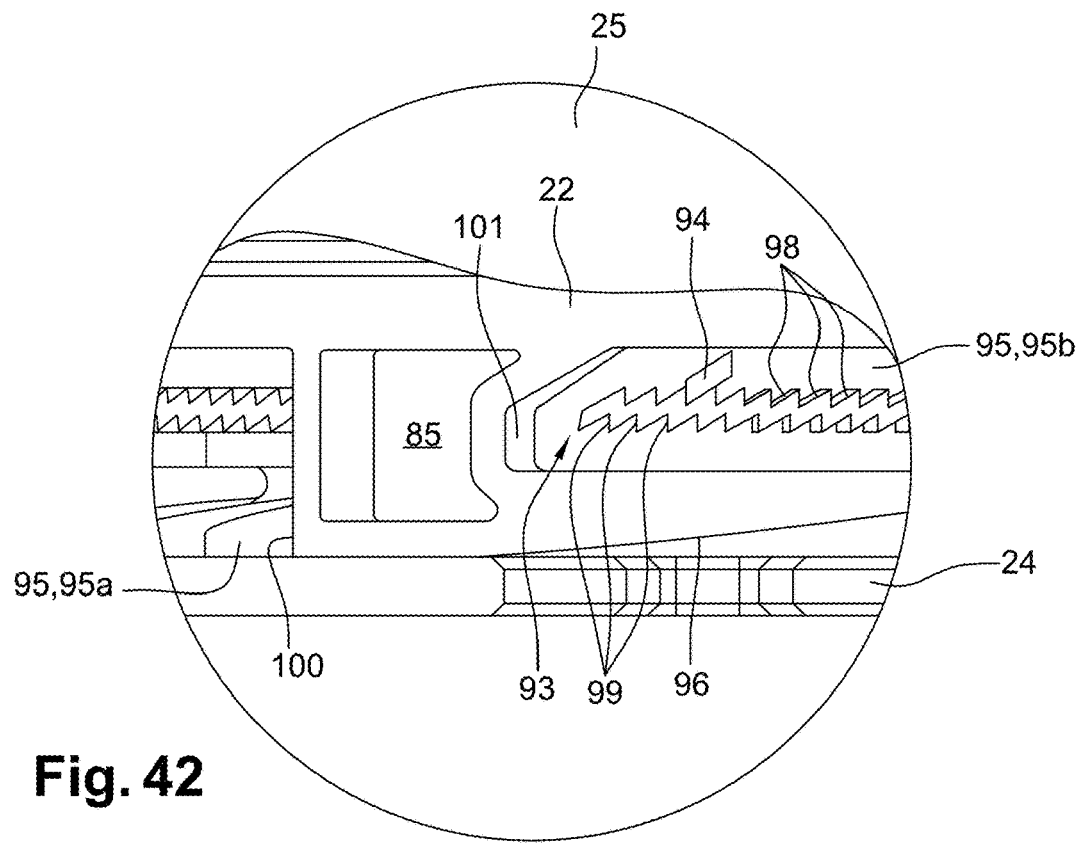
Figure 43:
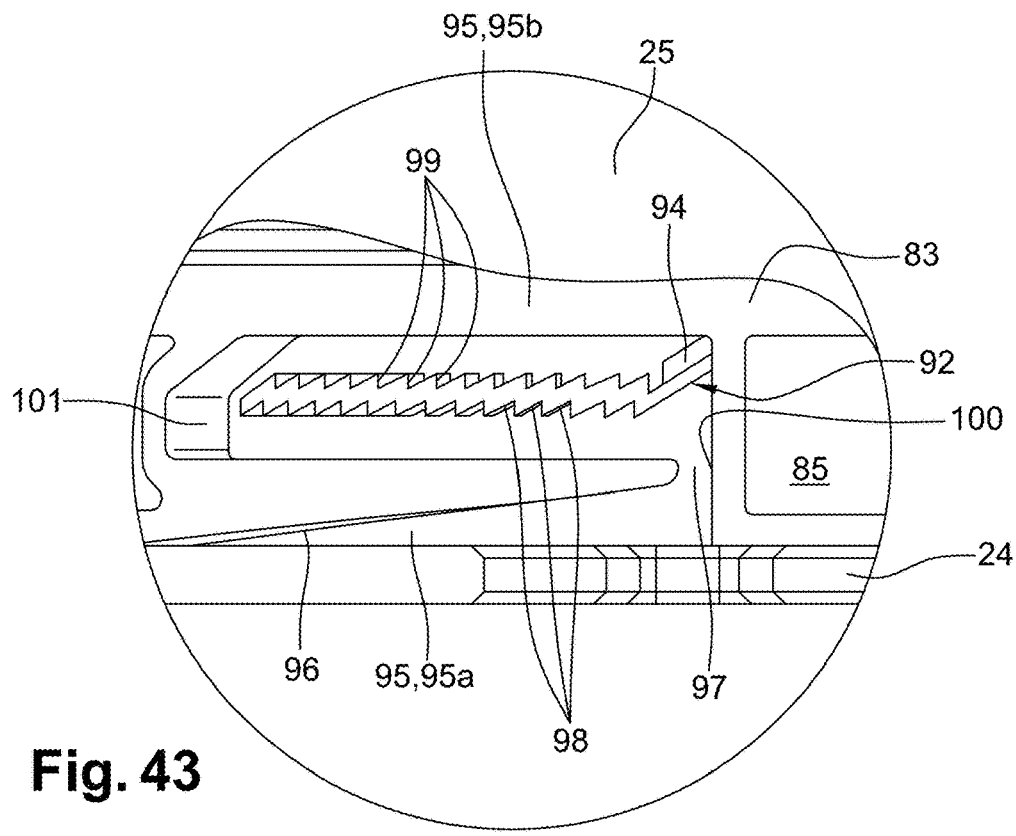

During this pivoting, the openings 27, 86 are gradually released or opened, by partial or total alignment of the openings 86, 27 of the closing member 83 and the body 21. During this opening phase, each tab 94 of the body 21 moves along the first toothed zone 91a, by elastic deformation of the tab 94, from the first end 92 (initial closed position shown in FIG. 39) to the second end 93 (open position shown in FIG. 41). FIG. 40 shows an intermediate position, i.e. a partial open position. As previously indicated, during this opening phase, only an opening movement is allowed by the shape of the teeth and tabs 94, i.e. a movement of the tab 94 from the first end 92 to the second end 93 of the first toothed zone 91a.

In addition, when opening the device 20, the indentations 26, 89 of the body 21 and the closing member 83 are no longer aligned with each other, so that the removal of device 20 from the support 2 and the coupling member 17 is prevented.

Figure 36:
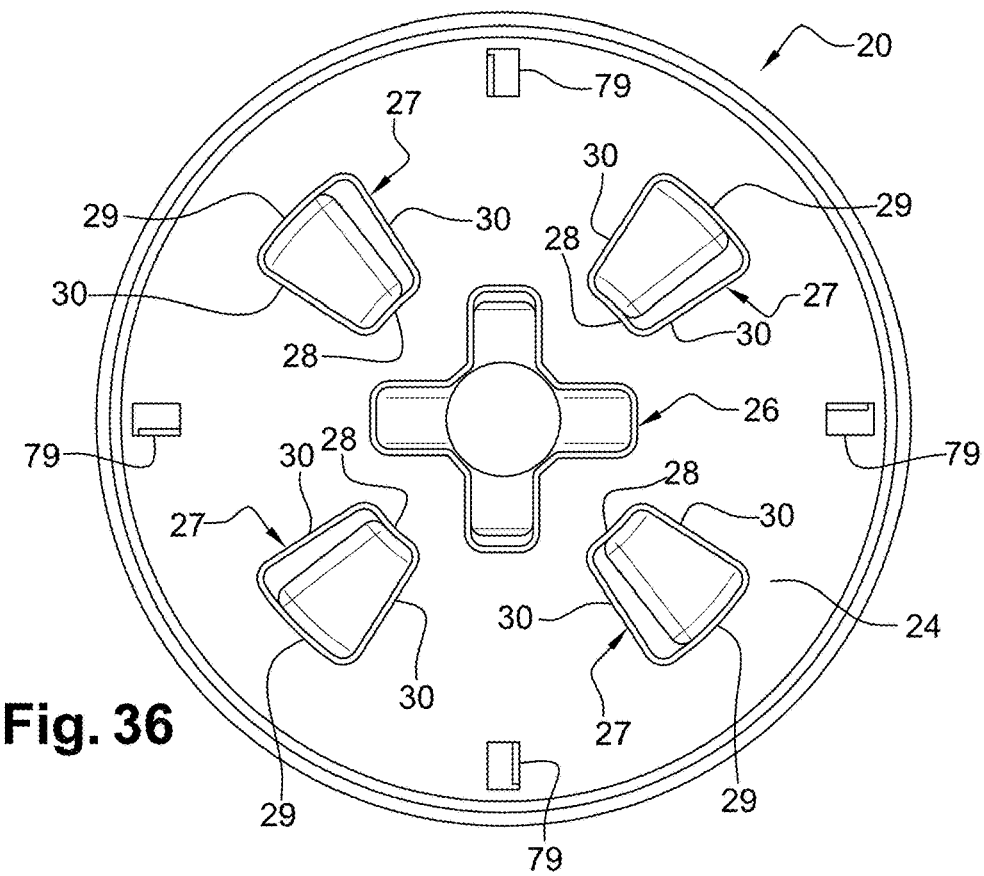
FIG. 36 is a bottom view showing the device in the closed position.

In the initial closed position (FIGS. 36 and 39), the tab 94 is supported on a first stop surface 100 forming a circumferential end of the second part 95b of the channel 95. In the open position (FIGS. 38 and 41), the tab 94 is supported on a second stop surface 101 forming a circumferential end of the second part 95b of the channel 95, opposite the first stop surface 100.

In the open position, the openings 89, 26 of the closing member 83 and the body 21 are fully aligned or facing each other.

The total allowed displacement α3 (FIG. 38) between the open and closed positions is for example between 45° and 90°, for example around 60°.

Figure 37:
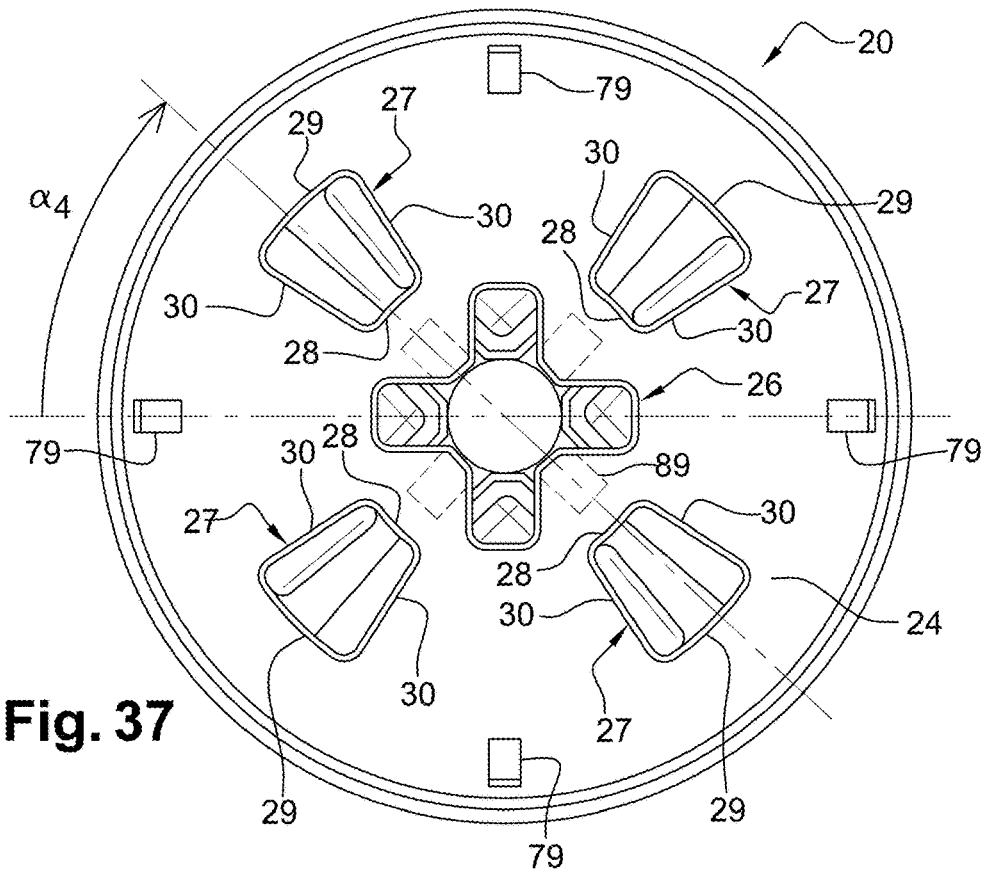
FIG. 37 is a view corresponding to FIG. 5, and showing the device in a partial open position.

The dispensing of balls 7 can be allowed for a partial opening of the device 20, i.e. if the angle of rotation a' (FIG. 37) of the closing member 83 relative to the body 21 is greater than a determined value, for example between 40 and 50°, in particular 43°. This intermediate position is illustrated in FIG. 37. The dispensed balls 7 are recovered and stored in the collecting device 1 of the analysis appliance. The helix portions 87 and the central conical part 88 facilitate the dispensing of the balls 7 by directing them by gravity towards the openings 86, 28. The balls 7 are then used to be automatically introduced into the reaction vessels.

Figure 8:
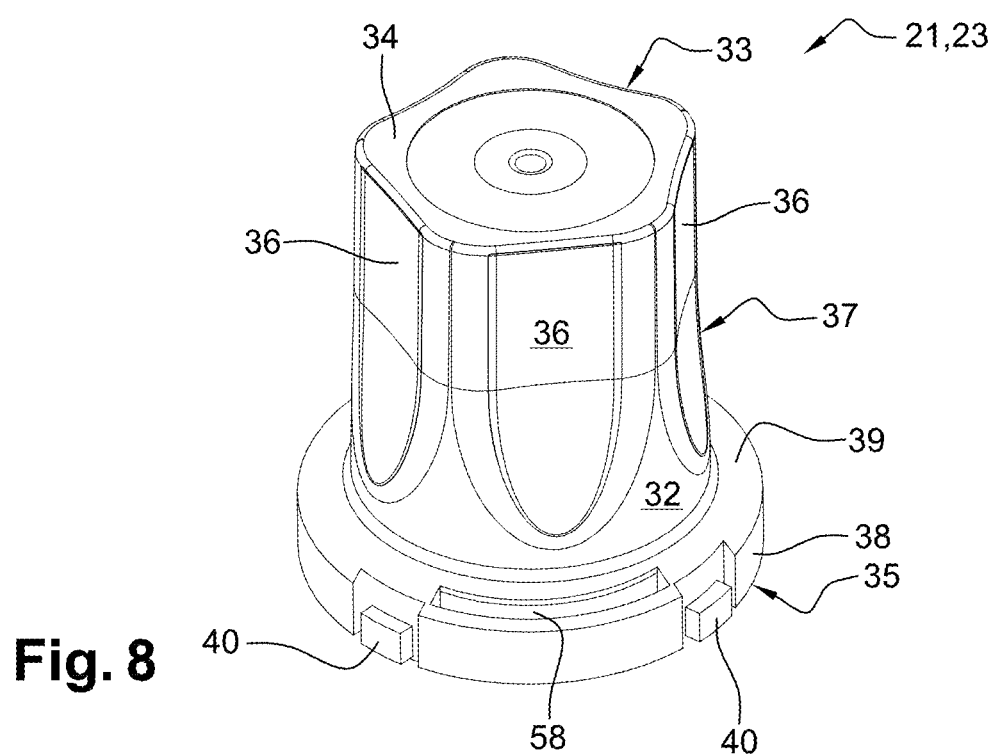
FIG. 8 is a perspective top view of the second part of the body.
Figure 9:
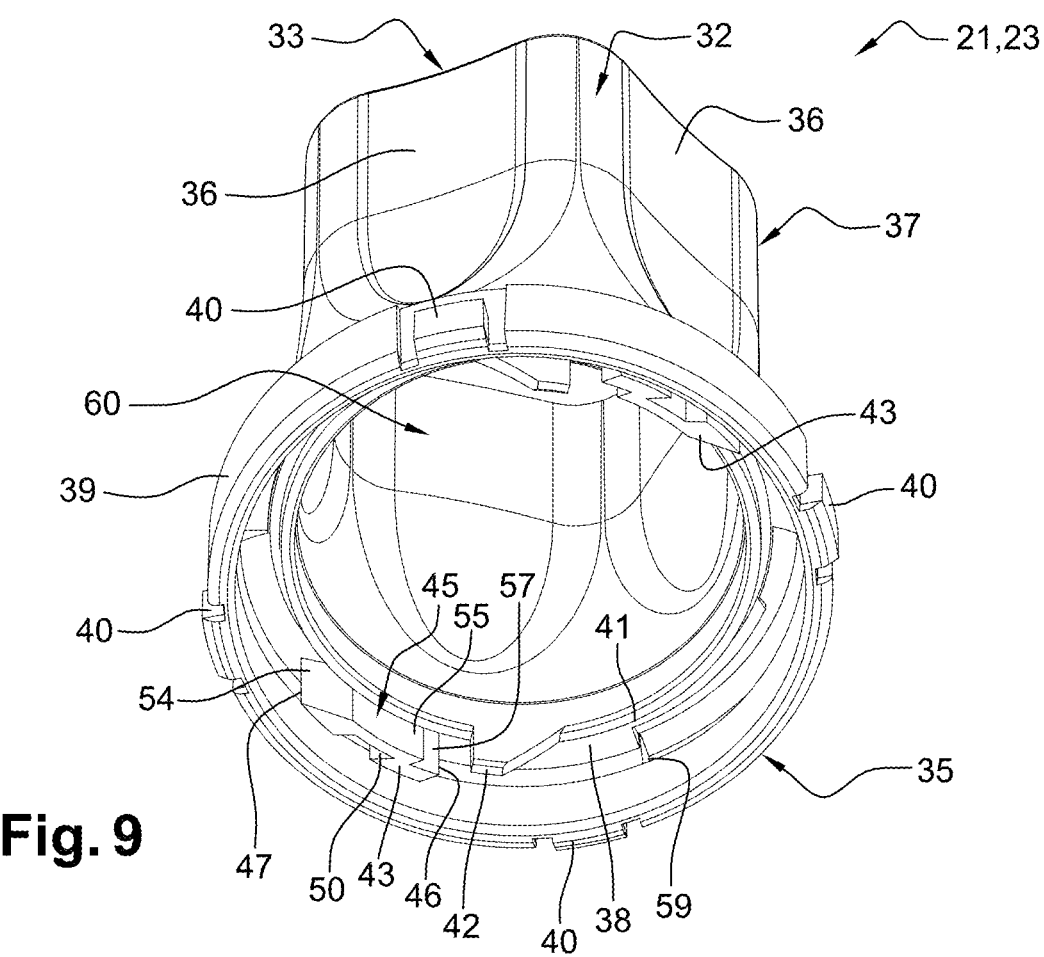
FIG. 9 is a perspective bottom view of the second part of the body.
Figure 10:
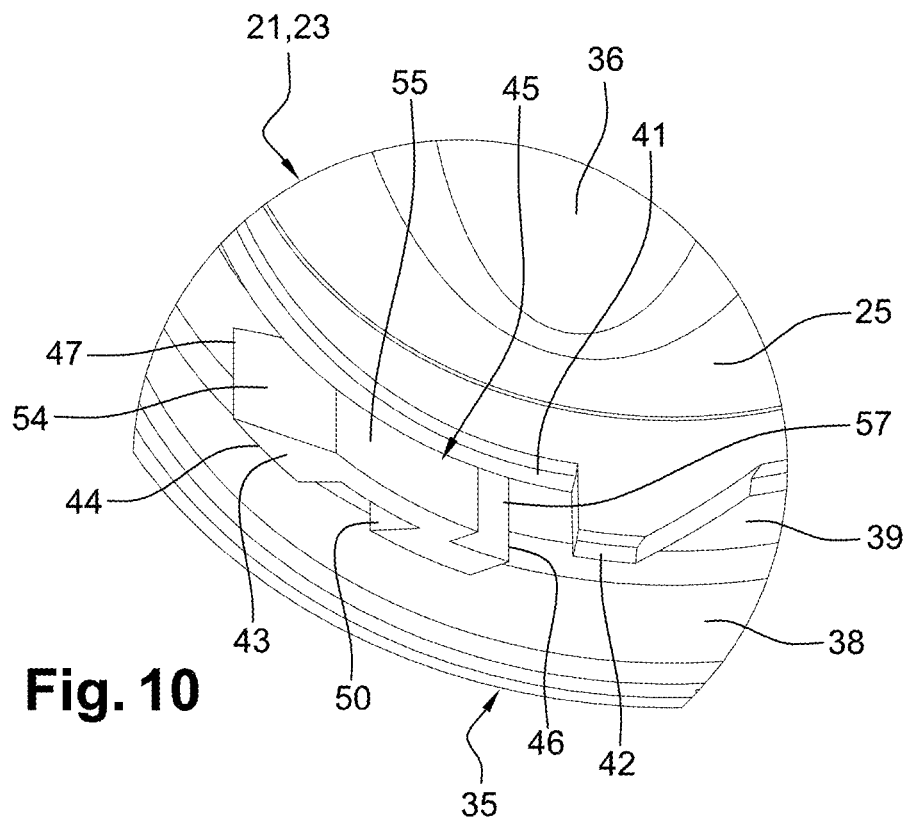
FIG. 10 is a detailed view of a zone of FIG. 9.
Figure 11:
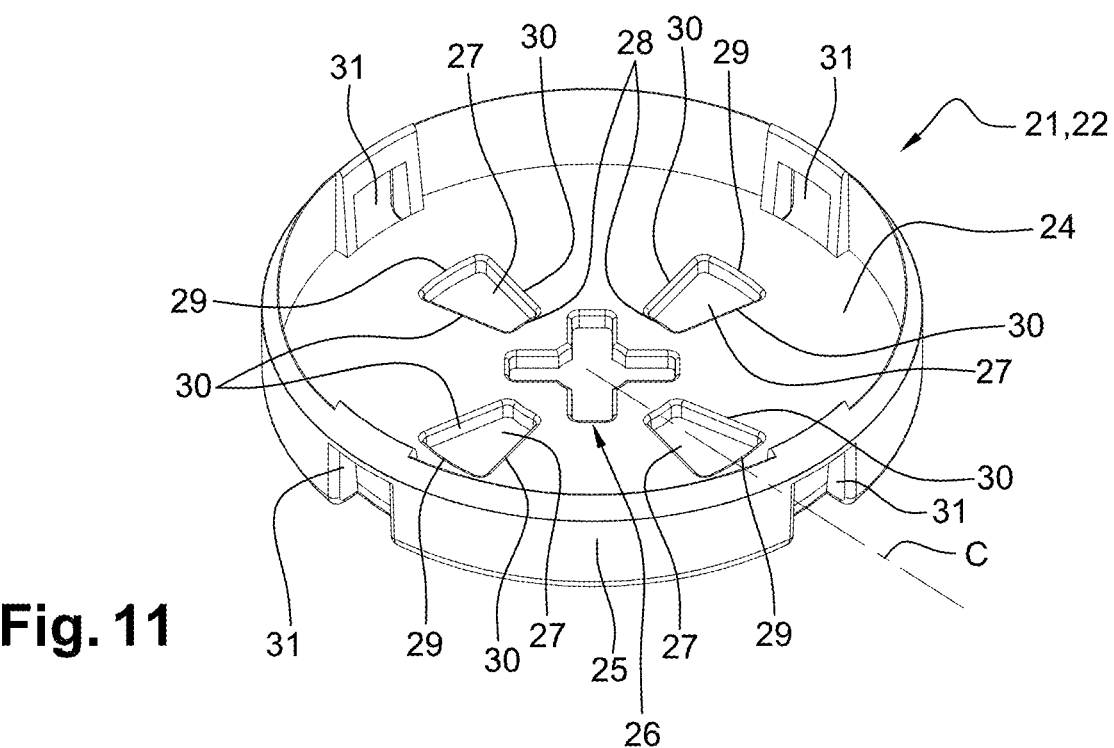
FIG. 11 is a perspective top view of the first part of the body.
Figure 12:
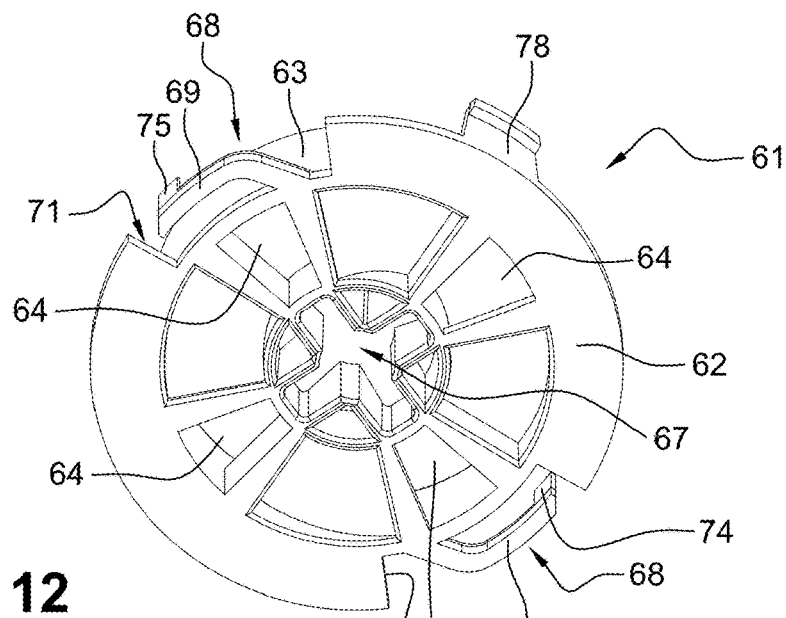
FIG. 12 is a perspective bottom view of the closing member.
Figure 13:
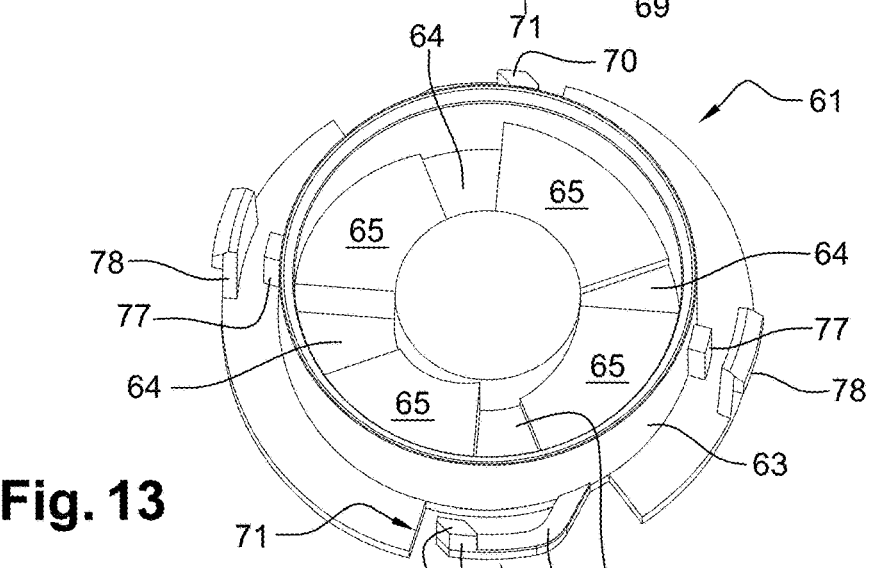
FIG. 13 is a perspective top view of the closing member.
Figure 14:
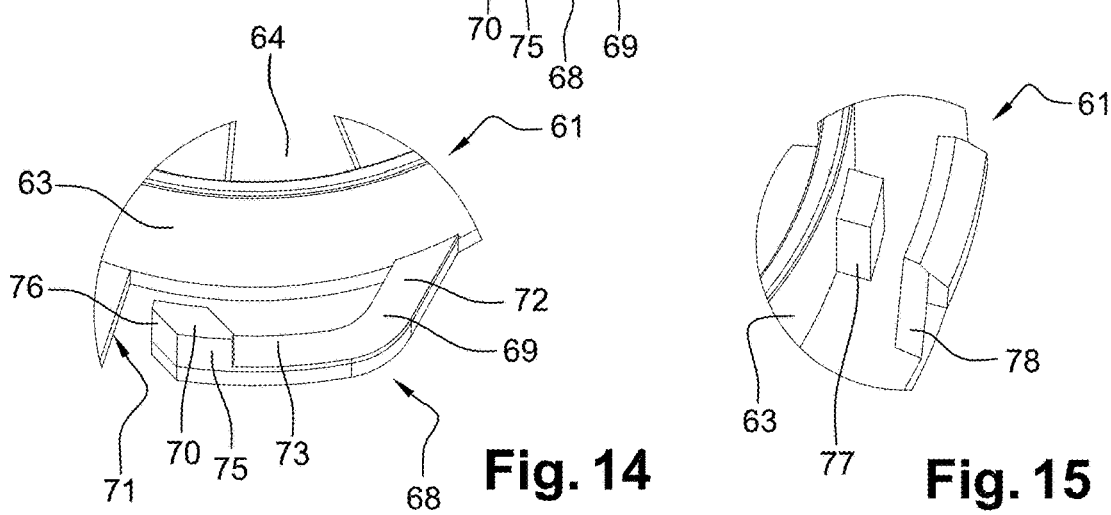
FIGS. 14 and 15 are detailed views of the zones of FIG. 13.
Figure 15:
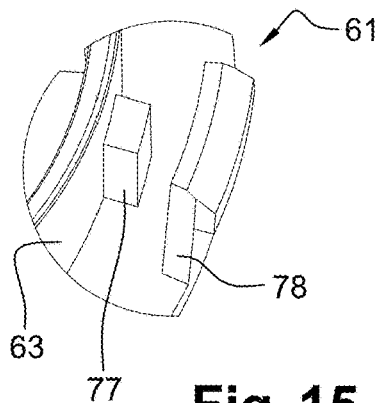

From the open position shown in FIGS. 8 and 11, when all the balls 7 have been dispensed from the internal volume 60 of the device 20, the operator can close the device 20 by manually rotating the body 21 in the direction opposite the opening direction. During this closing phase, due to the inclination of the tab 94 and the inclined surface 98 of the end tooth, located at the second end 93, the tab 94 slides along the inclined surfaces 98 of the teeth of the second toothed zone 91b, by elastic deformation of the tab 94, from the second end 93 to the first end 92. FIG. 12 shows a partial closing position and FIG. 13 shows a total or final closed position of the device 20.

As indicated above, during this closing phase, only a closing movement is allowed by the shape of the teeth and the tabs 94, i.e. a movement of the tab 94 from the second end 93 to the first end 92 of the second toothed zone 91b.

Thus, once the final closed position is reached, it is no longer possible to open the device 20 again for later use. In other words, the device 20 is for single use only. This property is reinforced by the fact that the latching means 81, 82 complementary to the first part 22 and the second part 23 of the body 21 prevent the disassembly thereof.

Whatever the embodiment envisaged, the ball packaging device according to the invention is preferably for single use and makes it possible to secure the supply of balls to an automatic analysis machine and thus to secure the analysis process by avoiding the use of balls with physical characteristics other than those recommended for testing, which would have the effect of distorting the interpretation of the results obtained.

The invention claimed is:

1. A device for packaging balls for reaction vessels for an analysis appliance, comprising:
    a body configured to house the balls, an end surface of the body comprising an opening;
    a closing member mounted at the end surface of the body and configured to move pivotably relative to the body about an axis of rotation (B) between a closed position, in which a surface of the closing member closes the opening of the body, and an open position, in which the opening of the body aligns with a surface opening through the surface of the closing member so as to allow the balls to be dispensed from an interior of the body,
    wherein the end surface of the body has a first indentation located on the axis of rotation (B) and configured to permit passage of a coupling member therethrough, and the closing member has a second indentation located adjacent to and coaxial with the first indentation on the axis of rotation (B) and configured to cooperate with the coupling member, the first and second indentations aligned with the axis of rotation (B) so that the coupling member can remain engaged into the first and second indentations when the closing member rotates relative to the body,
    wherein, in the closed position, a shape of the second indentation aligns with a corresponding shape of the first indentation so that, in the closed position, the coupling member passes through both the first indentation and the second indentation so as to be received into a space formed by the second indentation by virtue of a shape cooperation between the coupling member and the second indentation, and
    wherein, in the open position, the second indentation is angularly spaced from the first indentation so that the shape of the first indentation is non-aligned with the shape of the second indentation and the first indentation prevents removal of the coupling member from the space formed by the second indentation through the first indentation.

2. The device according to claim 1, wherein the body has a first part and a second part mounted on or in the first part, the first and second parts defining a housing for the balls, the closing member being mounted in the housing.

3. The device according to claim 2, wherein the second part is attached to the first part by latching means, the latching means being adapted to allow latching of the first and second parts and to prevent withdrawal of the second part from the first part after latching of the first and second parts.

4. The device according to claim 1, wherein the closing member and the body have guide means for allowing rotation of the closing member relative to the body only from an initial closed position to the open position and then only from the open position to a final closed position.

5. The device according to claim 4, wherein the guide means comprise a first latching zone and a second latching zone opposite the first latching zone,
    the guide means further comprising an elastic tab that cooperates with the first latching zone during the rotation of the closing member relative to the body from the initial closed position to the open position, the elastic tab cooperating with the second latching zone during the rotation of the closing member relative to the body from the open position to the final closed position,
    the first and second latching zones provided on the closing member and the elastic tab provided on the body, or vice versa.

6. The device according to claim 5, wherein each one of the first and second latching zones extends circumferentially in an arc of a circle.

7. The device according to claim 5, wherein each one of the first and second latching zones is toothed and extends in a radial plane, each tooth of the toothed first and second latching zones having an inclined surface relative to the corresponding radial plane and a stop surface extending perpendicular to the radial plane.

8. The device according to claim 4, wherein the guide means includes stop means that limit the rotation of the closing member between the open and closed positions.

9. The device according to claim 1, wherein the closing member comprises a helix portion or inclined surface inclined towards the surface opening of the closing member.

10. An assembly, having a packaging device according to claim 1, and a collecting device that comprises:
- a support, comprising a support opening and collecting means, the support opening being configured to be located opposite the opening of the body of the packaging device;
- a second closing member that is movable relative to the support between a second closed position in which the second closing member closes the support opening, and a second open position in which the support opening is open; and
- a second coupling member configured to cooperate with the closing member of the packaging device, the second closing member being movable in rotation relative to the second coupling member of the collecting device, so that in the second open position of the second closing member, the balls from the packaging device pass through the surface opening of the closing member and the body of the packaging device so as to then pass through the support opening of the support of the collecting device before being conveyed to the collecting means.

11. The assembly according to claim 10, further comprising:
- indexing means capable of maintaining the second closing member of the collecting device in the second open and closed positions, respectively.

12. The device according to claim 5, wherein the guide means includes stop means that limit the rotation of the closing member between the open and closed positions.

13. The device according to claim 6, wherein the guide means includes stop means that limit the rotation of the closing member between the open and closed positions.

14. The device according to claim 7, wherein the guide means includes stop means that limit the rotation of the closing member between the open and closed positions.

15. The device according to claim 2, wherein the closing member comprises a helix portion or inclined surface inclined towards the surface opening of the closing member.

* * * * *